US012647579B2

(12) United States Patent
Wang et al.

(10) Patent No.: US 12,647,579 B2
(45) Date of Patent: Jun. 2, 2026

(54) METHOD, DEVICE, AND MEDIUM FOR VIDEO PROCESSING USING TEMPORAL LAYER AND RESOLUTION DATA

(71) Applicants: Beijing Bytedance Network Technology Co., Ltd., Beijing (CN); Bytedance Inc., Los Angeles, CA (US)

(72) Inventors: Yang Wang, Beijing (CN); Na Zhang, Beijing (CN); Kai Zhang, Los Angeles, CA (US); Li Zhang, Los Angeles, CA (US); Tianliang Fu, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 122 days.

(21) Appl. No.: 18/282,954

(22) PCT Filed: Mar. 18, 2022

(86) PCT No.: PCT/CN2022/081619
§ 371 (c)(1),
(2) Date: Sep. 19, 2023

(87) PCT Pub. No.: WO2022/199469
PCT Pub. Date: Sep. 29, 2022

(65) Prior Publication Data
US 2024/0171754 A1 May 23, 2024

(30) Foreign Application Priority Data
Mar. 26, 2021 (WO) ................ PCT/CN2021/083253

(51) Int. Cl.
*H04N 19/172* (2014.01)
*H04N 19/136* (2014.01)
(Continued)

(52) U.S. Cl.
CPC ......... *H04N 19/172* (2014.11); *H04N 19/136* (2014.11); *H04N 19/177* (2014.11);
(Continued)

(58) Field of Classification Search
CPC .. H04N 19/172; H04N 19/136; H04N 19/177; H04N 19/31; H04N 19/70; H04N 19/88; H04N 19/503
(Continued)

(56) References Cited

U.S. PATENT DOCUMENTS

2008/0137742 A1* 6/2008 Chen .................... H04N 19/103
375/E7.243
2014/0376633 A1* 12/2014 Zhang ................... H04N 19/597
375/240.16
(Continued)

FOREIGN PATENT DOCUMENTS

CN        111526368 A      8/2020
CN        112118443 A      12/2020
(Continued)

OTHER PUBLICATIONS

International Search Report in PCT/CN2022/081619, mailed Jun. 16, 2022, 4 pages.

*Primary Examiner* — Marnie A Matt
(74) *Attorney, Agent, or Firm* — Astute IP Law Group

(57) ABSTRACT

Embodiments of the present disclosure provide a solution for video processing. A method for video processing is proposed. The method comprises: obtaining a first reference picture list (RPL) for a target picture of a video; determining a set of candidate pictures from a plurality of coded pictures of the video, each of the set of candidate pictures having a same temporal layer identity (ID) as the target picture; obtaining a second RPL based on the set of candidate pictures and the first RPL; and performing a conversion
(Continued)

between the target picture and a bitstream of the video based on the second RPL. Compared with the conventional solution, the proposed method can advantageously improve the coding efficiency.

23 Claims, 15 Drawing Sheets

(51) Int. Cl.
| | |
|---|---|
| *H04N 19/177* | (2014.01) |
| *H04N 19/31* | (2014.01) |
| *H04N 19/70* | (2014.01) |
| *H04N 19/88* | (2014.01) |

(52) U.S. Cl.
CPC ............. *H04N 19/31* (2014.11); *H04N 19/70* (2014.11); *H04N 19/88* (2014.11)

(58) Field of Classification Search
USPC ...................................................... 375/240.08
See application file for complete search history.

(56) References Cited

U.S. PATENT DOCUMENTS

| | | | |
|---|---|---|---|
| 2017/0127082 A1* | 5/2017 | Chen | ..................... H04N 19/517 |
| 2022/0060727 A1* | 2/2022 | Choi | ...................... H04N 19/44 |
| 2022/0210478 A1* | 6/2022 | Zhang | .................... H04N 19/13 |
| 2023/0013085 A1* | 1/2023 | Choi | .................... H04N 19/176 |

FOREIGN PATENT DOCUMENTS

| | | | | |
|---|---|---|---|---|
| CN | 112118453 A | 12/2020 | | |
| CN | 112118454 A | 12/2020 | | |
| WO | WO-2014092434 A2 * | 6/2014 | .......... | H04N 19/105 |
| WO | 2021052453 A1 | 3/2021 | | |

* cited by examiner

600

700

801

802

803

901

902

903

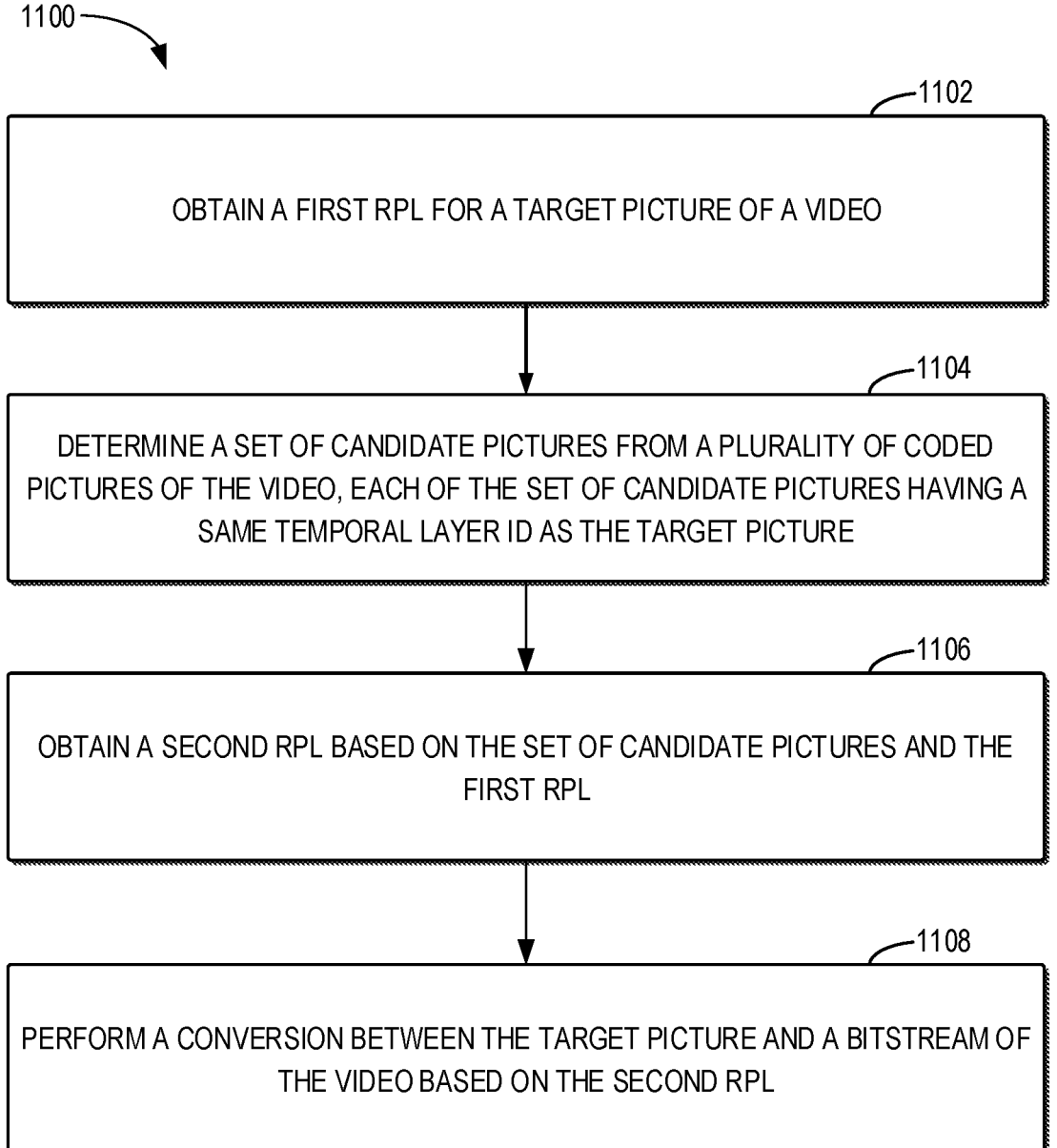

1100

OBTAIN A FIRST RPL FOR A TARGET PICTURE OF A VIDEO ⌐1102

DETERMINE A SET OF CANDIDATE PICTURES FROM A PLURALITY OF CODED PICTURES OF THE VIDEO, EACH OF THE SET OF CANDIDATE PICTURES HAVING A SAME TEMPORAL LAYER ID AS THE TARGET PICTURE ⌐1104

OBTAIN A SECOND RPL BASED ON THE SET OF CANDIDATE PICTURES AND THE FIRST RPL ⌐1106

PERFORM A CONVERSION BETWEEN THE TARGET PICTURE AND A BITSTREAM OF THE VIDEO BASED ON THE SECOND RPL ⌐1108

Fig. 11

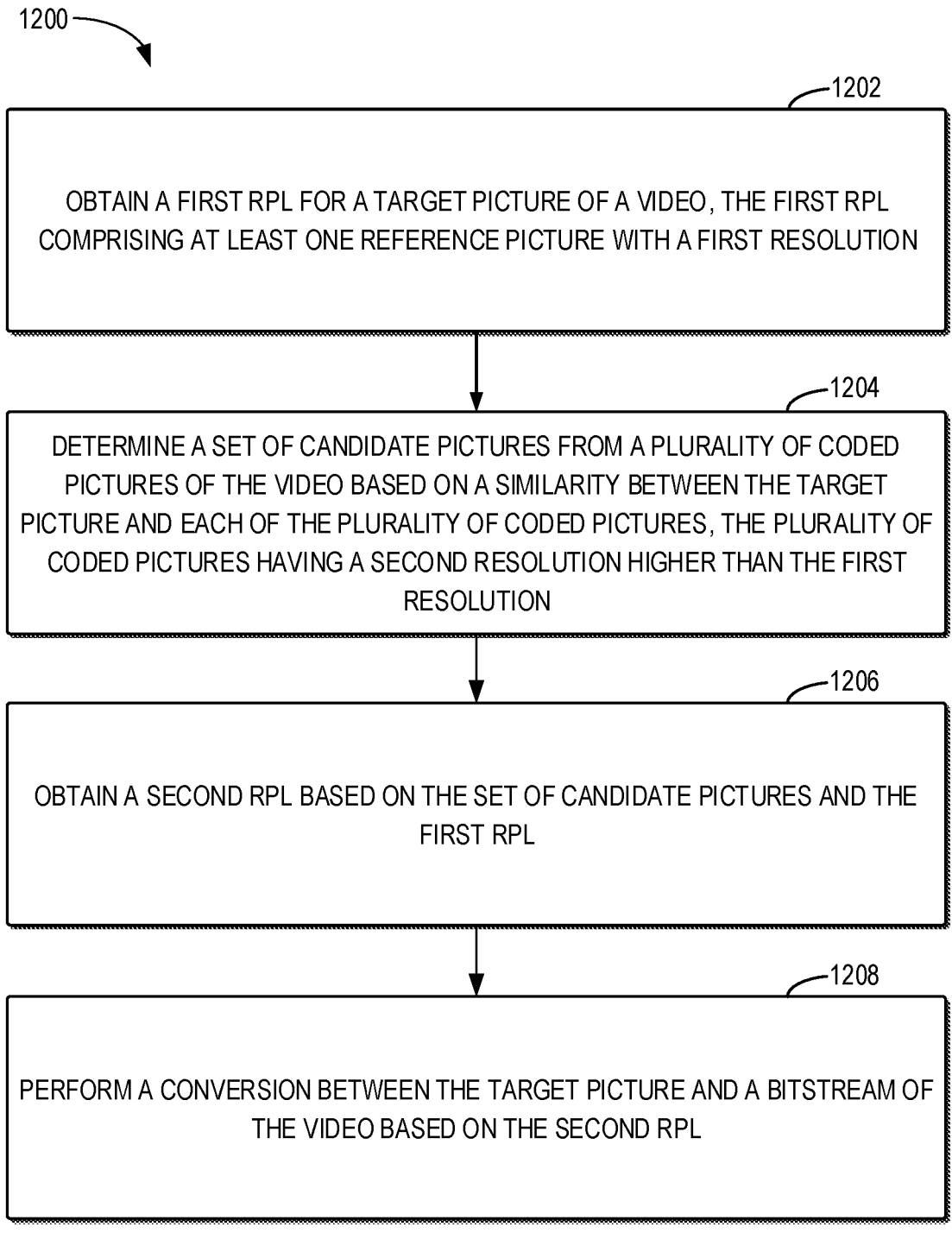

1200

1202

OBTAIN A FIRST RPL FOR A TARGET PICTURE OF A VIDEO, THE FIRST RPL COMPRISING AT LEAST ONE REFERENCE PICTURE WITH A FIRST RESOLUTION

1204

DETERMINE A SET OF CANDIDATE PICTURES FROM A PLURALITY OF CODED PICTURES OF THE VIDEO BASED ON A SIMILARITY BETWEEN THE TARGET PICTURE AND EACH OF THE PLURALITY OF CODED PICTURES, THE PLURALITY OF CODED PICTURES HAVING A SECOND RESOLUTION HIGHER THAN THE FIRST RESOLUTION

1206

OBTAIN A SECOND RPL BASED ON THE SET OF CANDIDATE PICTURES AND THE FIRST RPL

1208

PERFORM A CONVERSION BETWEEN THE TARGET PICTURE AND A BITSTREAM OF THE VIDEO BASED ON THE SECOND RPL

METHOD, DEVICE, AND MEDIUM FOR VIDEO PROCESSING USING TEMPORAL LAYER AND RESOLUTION DATA

FIELD

This is a national stage application filed under 37 U.S.C. 371 of International Patent Application No. PCT/CN2022/081619, filed Mar. 18, 2022, which claims priority to Chinese Patent Application No. PCT/CN2021/083253, filed Mar. 26, 2021, the disclosures of which are incorporated herein by reference in their entireties. Embodiments of the present disclosure relates generally to video coding techniques, and more particularly, to reference structure for video coding.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally very low, which is undesirable.

SUMMARY

Embodiments of the present disclosure provide a solution for video processing.

In a first aspect, a method for video processing is proposed. The method comprises: obtaining a first reference picture list (RPL) for a target picture of a video; determining a set of candidate pictures from a plurality of coded pictures of the video, each of the set of candidate pictures having a same temporal layer identity (ID) as the target picture; obtaining a second RPL based on the set of candidate pictures and the first RPL; and performing a conversion between the target picture and a bitstream of the video based on the second RPL. The method in accordance with the first aspect of the present disclosure employs coded pictures in the same temporal layer as the target picture for inter-coding, which makes it possible to enrich the reference pictures used for inter-coding and improve the quality of the reference pictures. Compared with the conventional solution, the proposed method can advantageously improve the coding efficiency.

In a second aspect, another method for video processing is proposed. The method comprises: obtaining a first reference picture list (RPL) for a target picture of a video, the first RPL comprising at least one reference picture with a first resolution; determining a set of candidate pictures from a plurality of coded pictures of the video based on a similarity between the target picture and each of the plurality of coded pictures, the plurality of coded pictures having a second resolution higher than the first resolution; obtaining a second RPL based on the set of candidate pictures and the first RPL; and performing a conversion between the target picture and a bitstream of the video based on the second RPL. The method in accordance with the second aspect of the present disclosure employs a coded picture, which has a higher resolution and a higher similarity with the target picture, as a reference picture for the target picture, which makes it possible to enrich the reference pictures can be used for inter-coding and improve the quality of the reference pictures. Compared with the conventional solution, the proposed method can advantageously improve the coding efficiency.

In a third aspect, a non-transitory computer-readable storage medium is proposed. The non-transitory computer-readable storage medium storing instructions that cause a processor to perform a method in accordance with the first or second aspect of the present disclosure.

In a fourth aspect, a non-transitory computer-readable storage medium is proposed. The non-transitory computer-readable storage medium storing instructions that cause a processor to perform a method in accordance with the first or second aspect of the present disclosure.

In a fifth aspect, a non-transitory computer-readable recording medium is proposed. The non-transitory computer-readable recording medium storing a bitstream of a video which is generated by a method in accordance with the first or second aspect of the present disclosure, wherein the method is performed by a video processing apparatus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 11 illustrates a flowchart of a method for video processing in accordance with some embodiments of the present disclosure;

FIG. 12 illustrates a flowchart of another method for video processing in accordance with some embodiments of the present disclosure.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
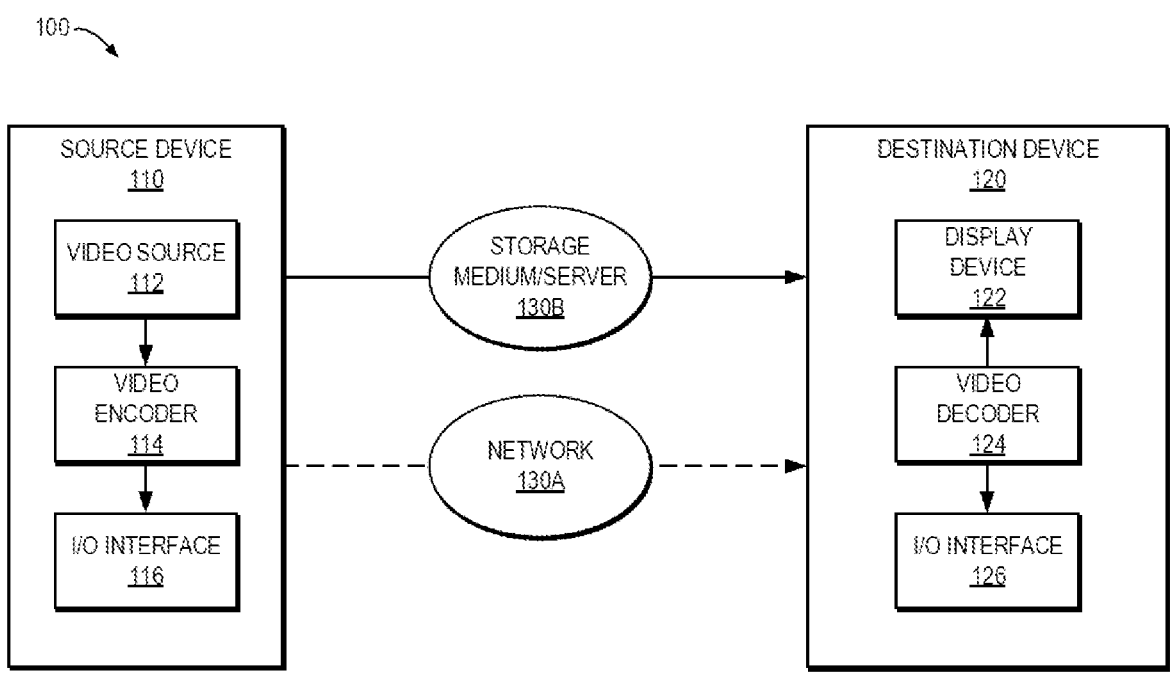
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which be configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
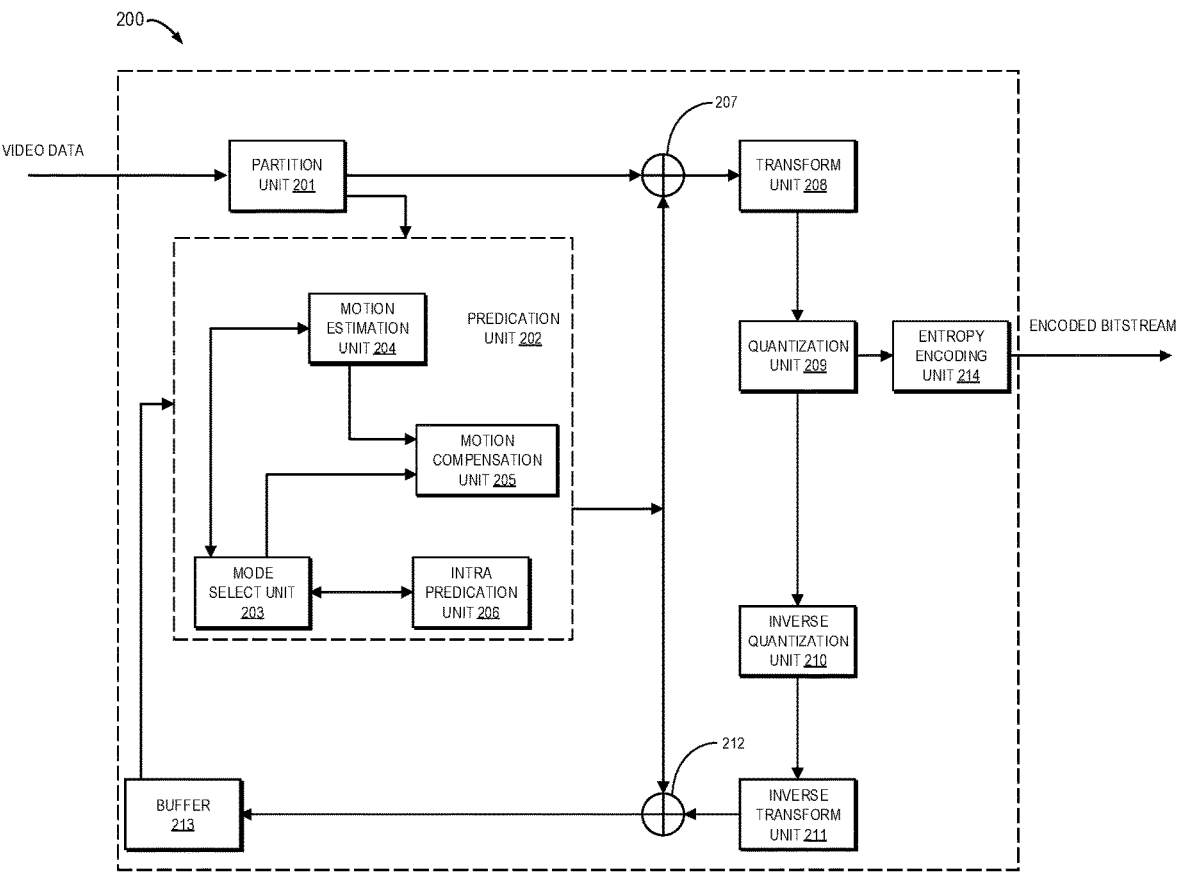
FIG. 2 illustrates a block diagram that illustrates a first example video encoder, in accordance with some embodiments of the present disclosure.

FIG. 2 is a block diagram illustrating an example of video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some example, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed reduce video blocking artifacts in the video block.

The entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 3:
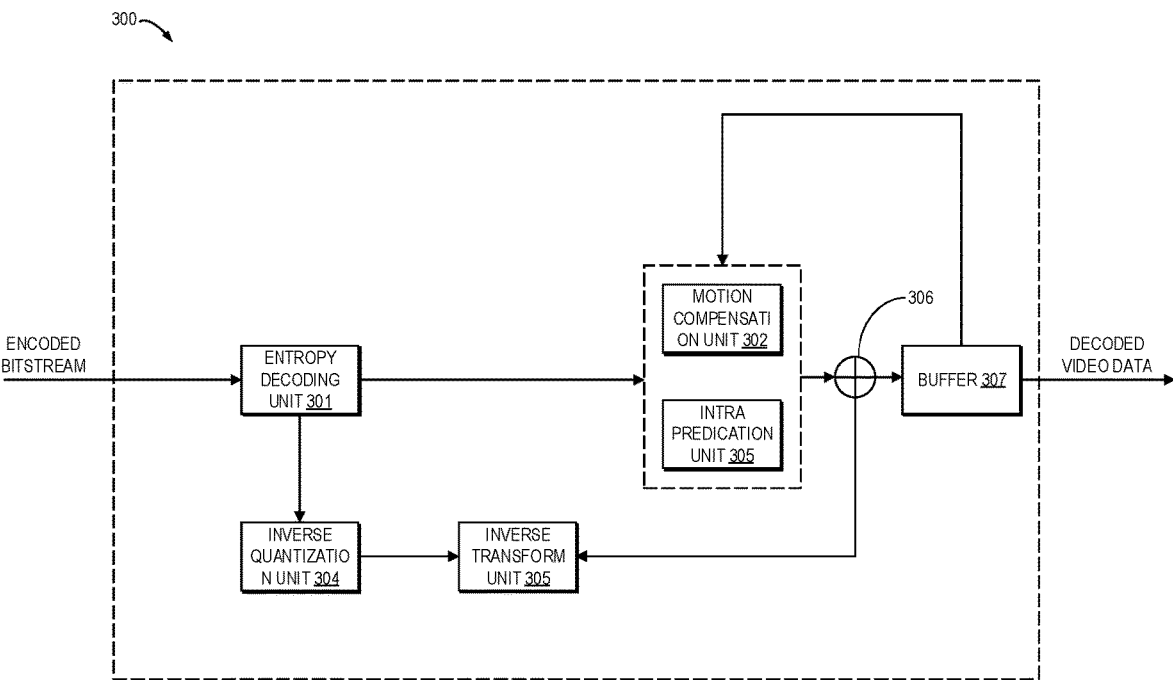
FIG. 3 illustrates a block diagram that illustrates an example video decoder, in accordance with some embodiments of the present disclosure.

FIG. 3 is a block diagram illustrating an example of video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The Entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by video encoder 20 during encoding of the video block to calculate interpolated values for sub-integer pixels of a reference block. The motion compensation unit 302 may determine the interpolation filters used by video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 303 inverse quantizes, i.e., de-quantizes, the quantized video block coefficients provided in the bitstream and decoded by entropy decoding unit 301. Inverse transform unit 303 applies an inverse transform.

The reconstruction unit 306 may obtain the decoded blocks, e.g., by sum the residual blocks with the corresponding prediction blocks generated by motion compensation unit 202 or intra-prediction unit 303. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to the reference structure in image/video coding. It may be applied to the video coding standard like HEVC, AV1, AVS3, or VVC. It may be also applicable to future video coding standards or video codecs.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. An example of a typical HEVC encoder framework is depicted as follows:

2.1 The Development of RPR

One of the target applications of VVC is real-time communication, such as video conferencing. These applications can benefit from the reference picture resampling (RPR) feature for adaptive video transmission under different network conditions in VVC, supporting spatial resolution changes within a video sequence. More specifically, when the network condition gets worse with lower available bandwidth, the encoder can adapt to it by encoding low-resolution (LR) frames. By contrast, the encoder could transmit the original full-resolution video when the network condition gets better.

The basic idea, down-sampling the video frame before compression and getting reconstructed frame by up-sampling after decompression, is first introduced and exploited for image compression standard. A convention solution extended this idea to DCT domain for low bitrate video coding. Based on the adaptive down-sampling to improve image compression, a convention solution implements an adaptive spatial resampling method for better video compression at low bitrate. A convention solution provides a practical algorithm to find the optimal down-sampling ratio that balances the distortions caused by down-sampling and coding. A convention solution performs rate-distortion optimization (RDO) to determine the coding structure between regular coding and down-sampling coding. In a convention solution, state-of-the-art video coding and super-resolution (SR) techniques are combined to improve video compression both in terms of coding efficiency and complexity. In a convention solution, the dependency between resampling cost and the quantization parameter (QP) threshold determining whether to resample was studied, based on which a spatial resolution adaptation scheme for video compression was proposed. An adaptive resolution change (ARC) method is adopted in VVC to provide better adaptation of the video transmission under dynamic network environments.

2.2 RPR in VVC

In the previous video compression standards, such as H.264/AVC and H.265/HEVC, changing picture resolution can only be implemented by inserting an instantaneous decoder refresh (IDR) or intra random access picture (TRAP) with a new resolution setting. An IDR or TRAP picture with reasonable quality tends to consume more bits than an inter-coded picture and correspondingly take more time to decode. The low-latency buffer conditions are broken as the end-to-end delay will increase, providing poor user experience.

To enable adaptive resolution changes without the insertion of an IDR or TRAP, the RPR feature is supported in VVC. In the sequence parameter set (SPS), a list of picture resolutions is signaled and an index to the list is signaled in the picture parameter set (PPS) to specify the size of an individual picture. Therefore, an arbitrary scaling ratio for horizontal and vertical directions is supported.

When the resolutions of current picture and reference picture are different, the resampling process is necessary to enable motion compensation (MC) as resolution changes are performed within a coding video sequence. Block-based resampling method is adopted in VVC and reference pictures are stored in the decoded picture buffer (DPB) with the coded size only. When the reference pictures differ from current picture in resolution, prediction samples are generated according to the following steps. First, the resolution scaling ratio between reference picture and current picture is calculated. Second, the sub-pixel positions in the reference picture pointed to by the MV are derived based on the scaling ratio. Last, interpolation filter designed specially is selected according to the scaling ratio and whether it is normal MC and then applied to obtain the target samples.

Figure 4:
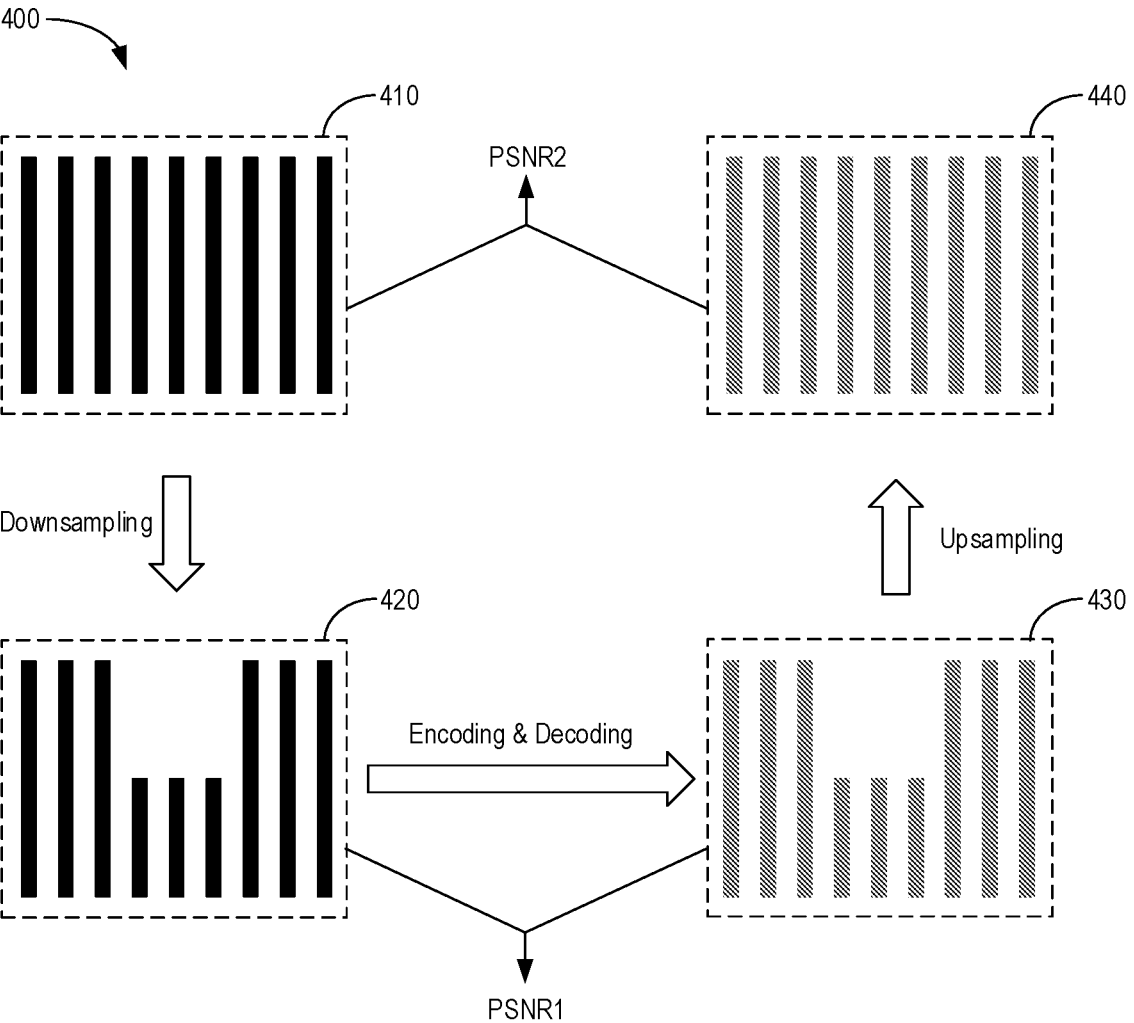
FIG. 4 is a schematic diagram illustrates the computation of PSNR1 and PSNR2.

In VVC, the common test conditions (CTC) for RPR configurations are established to evaluate the coding performance. Real-time communication with high requirements of low delay is the target application of RPR. Therefore, the low delay (LD) configurations are used to test RPR. In terms of resolution changes, two scaling ratios, 2:1 and 1.5:1 in both dimensions, are included. Besides, the resolutions of pictures change every 0.5 seconds. For performance evaluation, PSNR1 and PSNR2 as shown in FIG. 4 should be computed. FIG. 4 is a schematic diagram illustrates the computation of peak signal-to-noise ratio PSNR1 and PSNR2. In FIG. 4, source pictures 410 (i.e., pictures with original resolution) are down-sampled to obtain the resample source pictures 420. The resample source pictures 420 are encoded first and then decoded to obtain the reconstructed pictures 430. The reconstructed pictures 430 are up-sampled to obtain the resampled version 440 of the reconstructed pictures, whose resolution is the same as original resolution. In FIG. 4, PSNR1 is computed between the resampled source picture 420 and reconstructed picture 430; PSNR2 is computed between picture with original resolution 410 and the resampled version 420 of reconstructed picture whose resolution is the same as original resolution.

Figure 5:
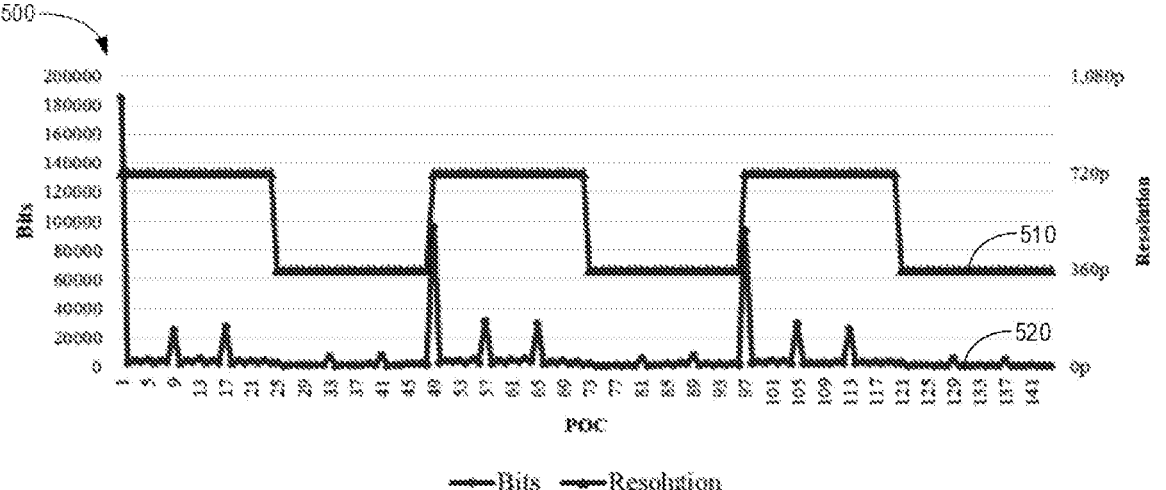
FIG. 5 illustrates bits cost for RPR in VVC.

FIG. 5 illustrates bits cost for RPR in VVC. The abscissa axis of FIG. 5 shows the picture order count (POC) of the pictures in a video. The curve 510 illustrates the resolution of the corresponding pictures. It is seen that, a part of the pictures has a resolution of 720p, while another part of the pictures has a resolution of 360p. The curve 520 illustrates the bits cost (i.e. the bits needed) for coding the corresponding pictures. It is seen that for a resolution increased picture (RIP), e.g. the picture with POC=49, the bits cost shoots up to several times as much as that of normal inter-coded pictures with the same resolution, e.g. the picture with POC=53.

Figure 6:
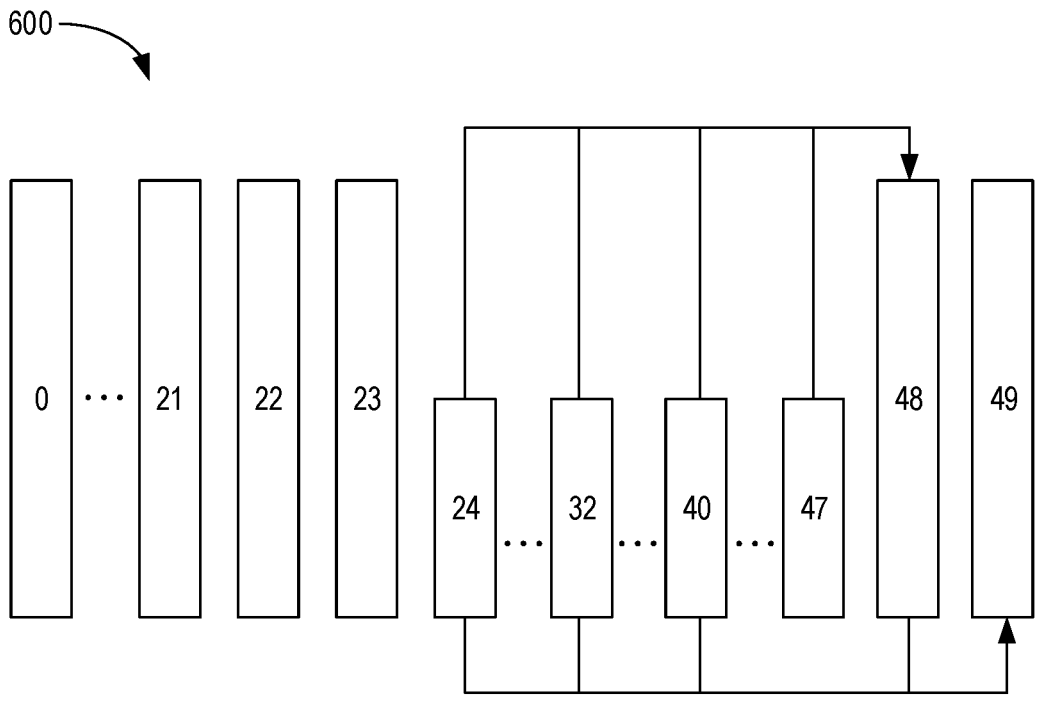
FIG. 6 illustrates an example reference structure for PRP.

FIG. 6 illustrates an example reference structure for PRP. In FIG. 6, pictures 0-23 and 48-49 are of a higher resolution than pictures 24-47. For ease of discussion, it is assumed that the coding order is the same as the POC for the description here. As shown in FIG. 6, the RPL of picture 48, which is a resolution increased picture, contains pictures 24, 32, 40 and 47, which are all LR pictures. Moreover, the RPL of picture 49 contains LR pictures 24, 32 and 40 and HR picture 48. Compared with HR references, LR references cannot provide accurate enough prediction for RIP.

2.3 Reference Structure of Random Access in VVC

Figure 7:
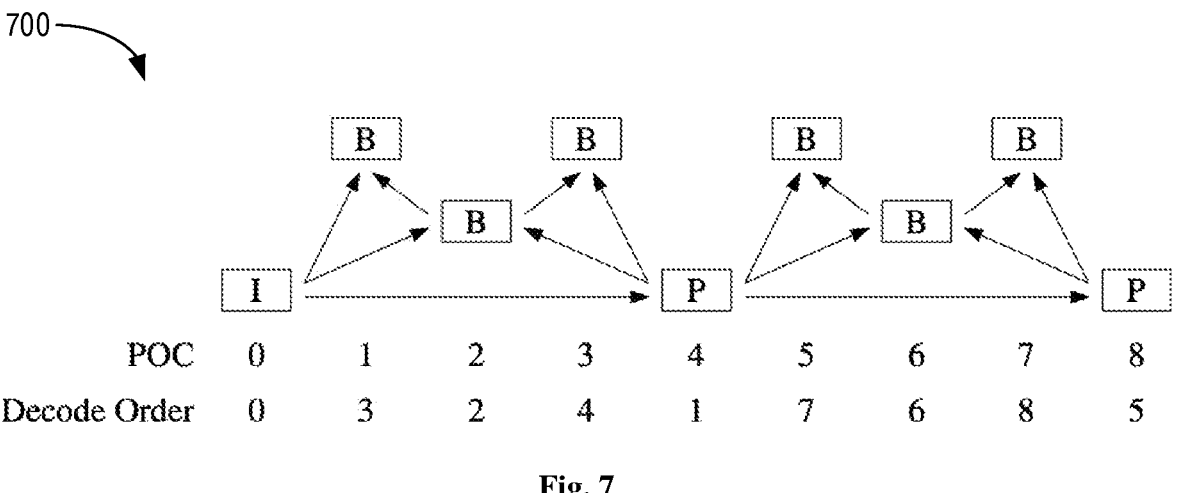
FIG. 7 illustrates an example GOP structure.

FIG. 7 illustrates an example group of pictures (GOP) structure. This GOP structure is of size 4. The POC and decoding order of individual pictures are shown. Therefore, frame 1 (i.e. the picture with decoding order 1) corresponds to a picture with POC=4. Frame 1 is a P-frame and references picture 0. Similarly, Frame 2 has a POC of 2, and it is a B-frame and references pictures 0 and 4. Frame 3 is a special case: even though it only references pictures with POC 0 and 2, its RPL also needs to include the picture with POC 4, which must be kept in order to be used as a reference picture in the future. The reference picture list for Frame 3 therefore contains frame 0, frame 1 and frame 2. Frame 4 has a POC of 3 and its reference picture list contains frame 1 and frame 2.

3. Problems

1. Although RPR can change the resolution of any frames without introducing TRAP pictures (e.g., IDR or CRA), reducing the bitrate surge brought by IRAP pictures, the heavy burden on bits cost still exists. For resolution decreased pictures (RDP), the bits cost is no longer a heavy burden with the introduction of RPR. However, for resolution increased pictures (RIP), the bits cost shoots up to several times as much as that of normal inter-coded pictures with the same resolution.
2. Conventional design of RPR focuses on the resampling procedures and methods of referring from pictures with different resolutions. However, the reference structure for RPR is not considered, which may limit the efficiency of RPR.
3. In random access (RA) configuration of current common test condition (CTC) of VVC, reference pictures can only come from lower temporal layers except for pictures of temporal layer equal to 0. Reference pictures in the same temporal layers for pictures in other higher temporal layers are not explored, which may limit the efficiency of VVC for RA cases.

4. Embodiments of the Present Disclosure

In order to solve bitrate surge in RPR and further improve the coding performance, an enhanced reference structure for reference picture list (RPL) is proposed, including replacing low-resolution (LR) references in RPL with high-resolution (HR) references and adaptive decision on the number of HR references kept in RPL.

Figure 8A:
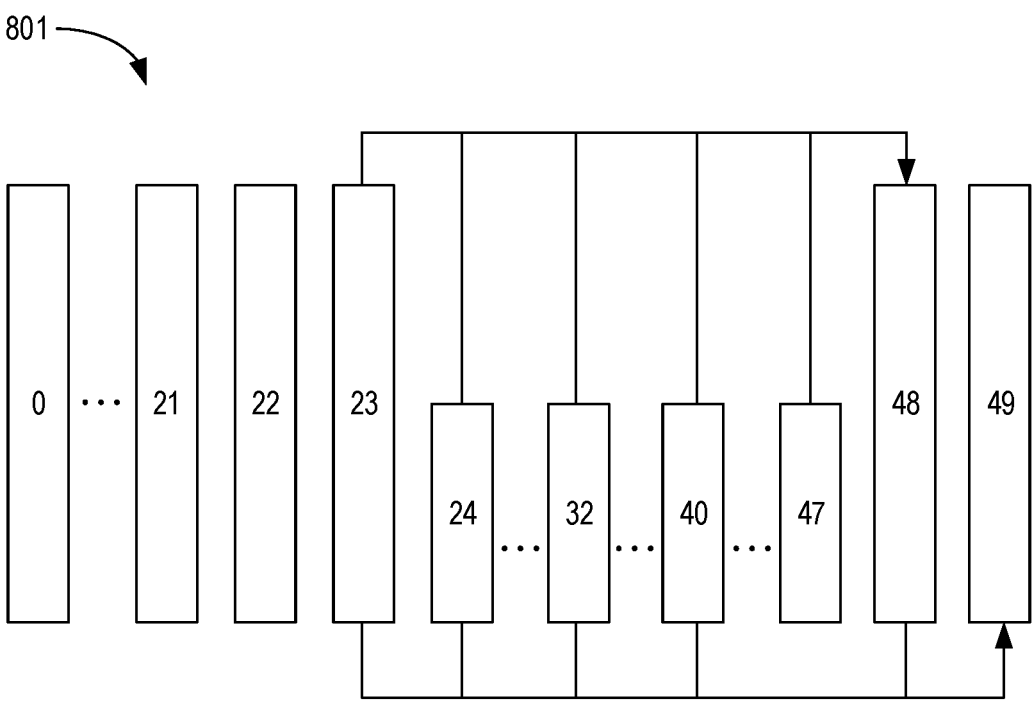
FIG. 8A illustrates a reference structure for PRP in accordance with an embodiment of the present disclosure.

The detailed embodiments below should be considered as examples to explain general concepts. These embodiments should not be interpreted in a narrow way. Furthermore, these embodiments can be combined in any manner.
Reference Structure for RPR 1. Instead of only using LR pictures as reference pictures in the RPL in current design of RPR, it is proposed to add one or more HR pictures as reference pictures into the RPL to construct a modified RPL, where the determination of which HR pictures are added and how to add the HR pictures may depend on a similarity between the HR picture and the current picture.
   a. In one example, the similarity may refer to the distance between the HR picture and the current picture (i.e., POC difference).
      (a) In one example, the HR picture with the smallest POC difference from the current picture may be added first.
   b. In one example, the similarity may refer to a metric evaluating the difference of the content and/or the motion between the HR picture and the current picture.
      (a) In one example, mean square error (MSE) may be used to evaluate the similarity. Such as, the HR picture with the smallest MSE may be added into the RPL first.
   c. In one example, one or more HR pictures may be added into the RPL as reference pictures without changing the LR pictures in the RPL. Denote the number of the added HR pictures as N wherein N is an integer being larger than 1.
      (a) In one example, N is a constant value.
         1. In one example, N is equal to 1. This case is shown in FIG. 8A. FIG. 8A illustrates a reference structure for PRP in accordance with an embodiment of the present disclosure. Compared with the convention reference structure shown in FIG. 6. HR picture 23 is added into the RPL of the picture 48 and the RPL of the picture 49, respectively. The modified RPL of picture 48 contains HR pictures 23 and LR pictures 24, 32, 40 and 47. The modified RPL of picture 49 contains HR pictures 23 and 48 and LR pictures 24, 32 and 40.

Figure 8B:
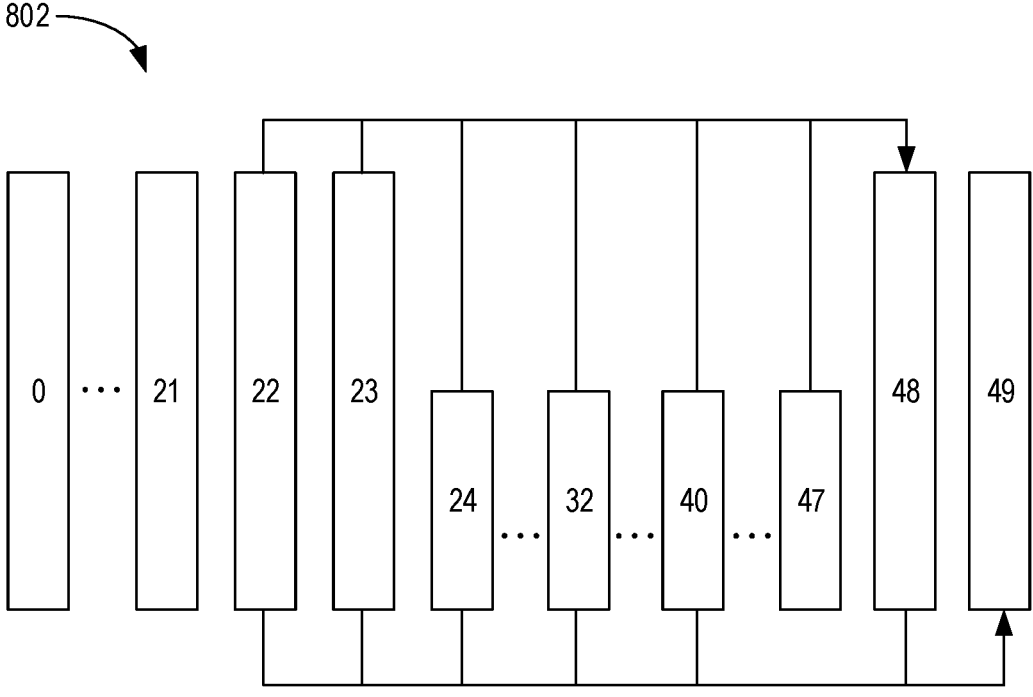
FIG. 8B illustrates a reference structure for PRP in accordance with an embodiment of the present disclosure.

2. In one example, N is equal to 2. This case is shown in FIG. 8B. FIG. 8B illustrates a reference structure for PRP in accordance with an embodiment of the present disclosure. Compared with the convention reference structure shown in FIG. 6. HR pictures 22 and 23 are added into the RPL of the picture 48 and the RPL of the picture 49, respectively. The modified RPL of picture 48 contains HR pictures 22 and 23 and LR pictures 24, 32, 40 and 47. The modified RPL of picture 49 contains HR pictures 22, 23 and 48 and LR pictures 24, 32 and 40.

Figure 8C:
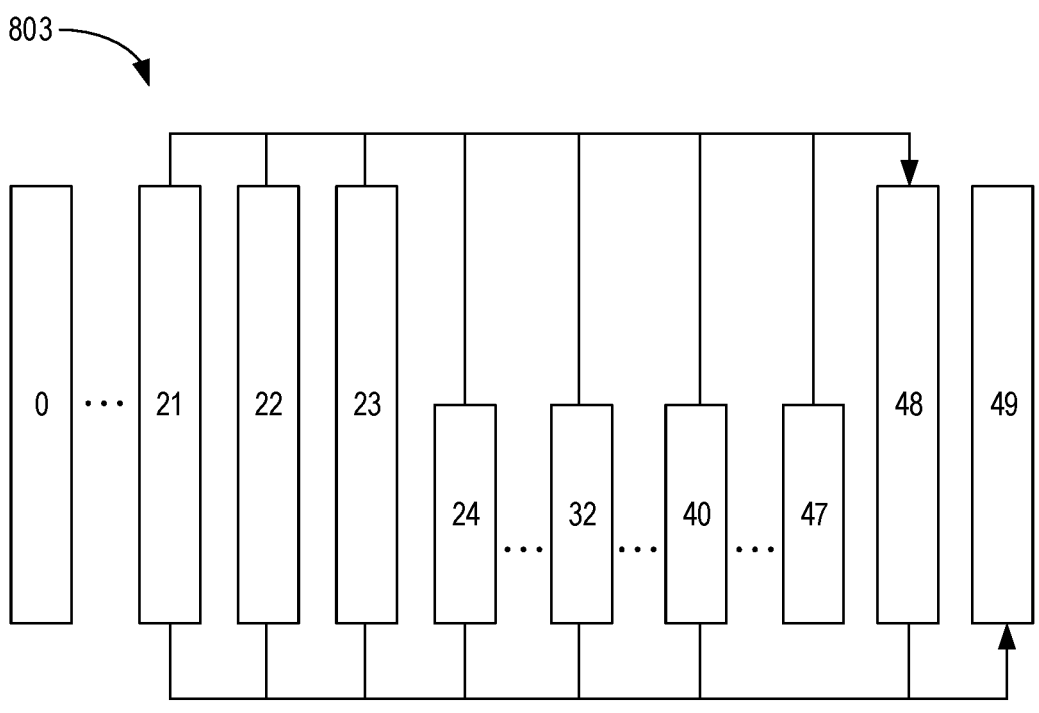
FIG. 8C illustrates a reference structure for PRP in accordance with an embodiment of the present disclosure.

3. In one example, N is equal to 3. This case is shown in FIG. 8C. FIG. 8C illustrates a reference structure for PRP in accordance with an embodiment of the present disclosure. Compared with the convention reference structure shown in FIG. 6. HR pictures 21, 22 and 23 are added into the RPL of the picture 48 and the RPL of the picture 49, respectively. The modified RPL of picture 48 contains HR pictures 21, 22 and 23 and LR pictures 24, 32, 40 and 47. The modified RPL of picture 49 contains HR pictures 21, 22, 23 and 48 and LR pictures 24, 32 and 40.

Figure 9A:
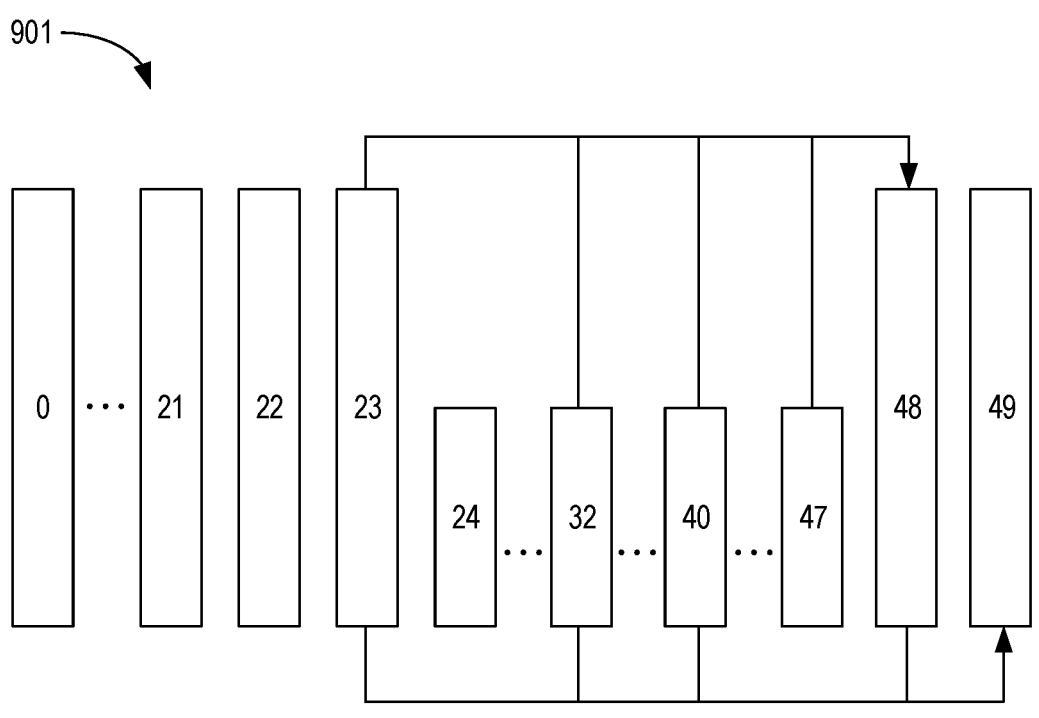
FIG. 9A illustrates a reference structure for PRP in accordance with an embodiment of the present disclosure.

(b) In one example, N may depend on coded information or video content.
      1. In one example, the coded information may refer to the statistical information in current/previous period, or/and current/previous GOP.
         a. In one example, N may depend on the number of blocks that are referred to HR pictures, or the ratio of blocks that are referred to HR pictures.
      2. In one example, N may depend on motion density (e.g., motion field, or motion vector).
      3. In one example, N may depend on the video content, such as the complexity of the texture complexity.
   (c) In one example, N may be signalled at VPS/PPS/APS/DPS/picture/sub-picture/slice/tile level.
   d. In one example, one or more HR pictures may be added into the RPL as reference pictures wherein some of LR pictures in the RPL are replaced by one or more newly added HR pictures to construct a modified RPL. Denote the number of the newly added HR pictures as N and the number of the replaced LR pictures as M, wherein M and N are integers, and M is less than and equal to N.
      (a) In one example, M is equal to N.
         1. In one example, N is equal to 1. This case is shown in FIG. 9A. FIG. 9A illustrates a reference structure for PRP in accordance with an embodiment of the present disclosure. Compared with the convention reference structure shown in FIG. 6. The LR picture 24 in both the RPL of the picture 48 and the RPL of the picture 49 is replaced with HR picture 23, respectively. The modified RPL of picture 48 contains HR pictures 23 and LR pictures 32, 40 and 47. The modified RPL of picture 49 contains HR pictures 23 and 48 and LR pictures 32 and 40.

Figure 9B:
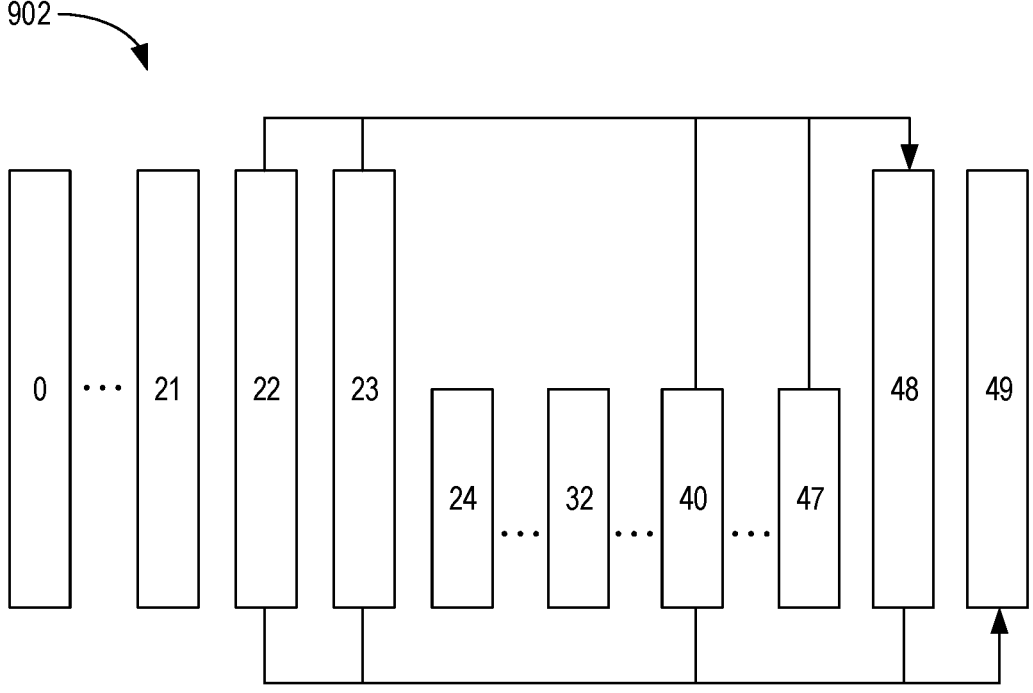
FIG. 9B illustrates a reference structure for PRP in accordance with an embodiment of the present disclosure.

2. In one example, N is equal to 2. This case is shown in FIG. 9B. FIG. 9B illustrates a reference structure for PRP in accordance with an embodiment of the present disclosure. Compared with the convention reference structure shown in FIG. 6. The LR pictures 24 and 32 in both the RPL of the picture 48 and the RPL of the picture 49 are replaced with HR pictures 22 and 23, respectively. The modified RPL of picture 48 contains HR pictures 22 and 23 and LR pictures 40 and 47. The modified RPL of picture 49 contains HR pictures 22, 23 and 48 and LR picture 40.

Figure 9C:
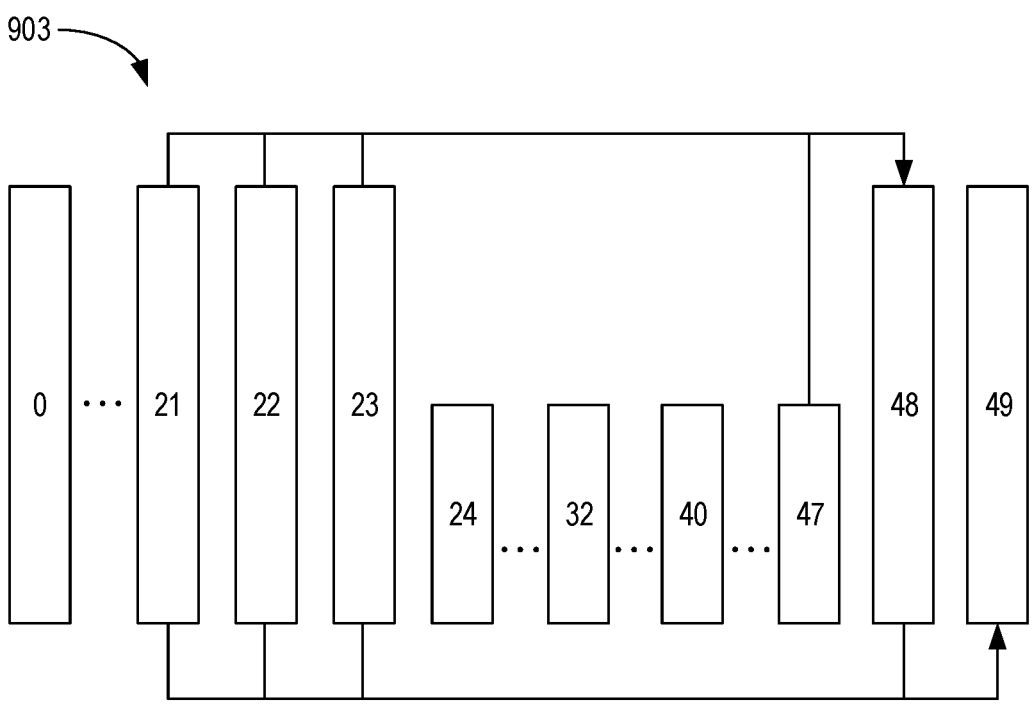
FIG. 9C illustrates a reference structure for PRP in accordance with an embodiment of the present disclosure.

3. In one example, N is equal to 3. This case is shown in FIG. 9C. FIG. 9C illustrates a reference structure for PRP in accordance with an embodiment of the present disclosure. Compared with the convention reference structure shown in FIG. 6. The LR pictures 24, 32 and 34 in both the RPL of the picture 48 and the RPL of the picture 49 are replaced with HR pictures 21, 22 and 23, respectively. The modified RPL of picture 48 contains HR pictures 21, 22 and 23 and LR picture 47. The modified RPL of picture 49 contains HR pictures 21, 22, 23 and 48.

e. In one example, the modified RPL may be applied for HR or/and LR pictures.

(a) In one example, the modified RPL may be applied for all pictures.

(b) Alternatively, the modified RPL may be applied to HR pictures.

1. In one example, the modified RPL may be applied for all HR pictures.

2. In one example, the modified RPL may be applied for HR pictures which only use LR pictures as reference pictures.

(c) Alternatively, the modified RPL may be applied to LR pictures.

1. In one example, the modified RPL may be applied for all LR pictures.

2. In one example, the modified RPL may be applied for LR pictures which only use HR pictures as reference pictures.

f. In one example, which the modified RPL is applied to may depend on coded information, or/and video content.

(a) In one example, the modified RPL may be applied to pictures coded using high QPs.

1. Alternatively, the modified RPL may be applied to pictures coded using low QPs.

(b) In one example, the modified RPL may be applied to pictures with less motion.

1. Alternatively, the modified RPL may be applied to pictures with much motion.

(c) In one example, the modified RPL may be applied to pictures with smoothing textures.

1. In one example, the modified RPL may be applied to pictures with complex textures.

2. In one example, the management of reference picture list(s) of a current picture may depend on the resolutions of the current picture and/or the reference picture.

a. In one example, the management of reference picture list(s) may refer to the process whether to remove one or more reference pictures from the reference picture list(s), and/or whether to keep one or more reference pictures in the reference picture list(s) to be used in the following encoding/decoding pictures.

b. In one example, a reference picture may be treated differently in the reference picture list if it is larger than the current picture (i.e., higher resolution), such as at least N HR reference pictures may be kept in the reference picture list.

(a) In one example, N=1.

(b) In one example, N=2.

c. In one example, a reference picture may be treated differently in the reference picture list if it is smaller than the current picture (i.e., lower resolution), such as at least M LR reference pictures may be removed from the reference picture list.

(a) In one example, M=1.

(b) In one example, M=2.

d. In one example, whether to and/or how to treat a reference picture in the reference picture list if it is larger than or smaller than the current picture may depend on a message signaled from encoder to decoder such as in SPS/PPS/picture header/slice header.

3. In one example, signaling of a reference picture index may depend on the resolutions of the current picture and the reference picture.

Reference Structure Using Pictures from the Same Temporal Layer

4. It is proposed that the management of reference picture list(s) of a current picture may depend on the temporal layer of the current picture and/or the reference picture.

5. Instead of only using pictures from lower temporal layers as reference pictures, it is proposed to add one or more pictures into the RPL as the reference pictures of current picture, wherein the added pictures are the same temporal layer as current picture. Denote the number of the added pictures as N.

a. In one example, whether pictures from the same temporal layers are added into the RPL may be configured at encoder, or/and decoder.

b. In one example, whether pictures from the same temporal layers are added into the RPL may be signalled at VPS/SPS/PPS/APS/picture/sub-picture/slice/tile level.

c. In one example, N may be a constant value.

(a) In one example, N may be equal to 1, or 2, or 3.

d. In one example, N may be configured or signalled.

e. In one example, whether the pictures from the same temporal layer can be added into the RPL may depend on the coding structure, or/and coded information.

Figure 10A:
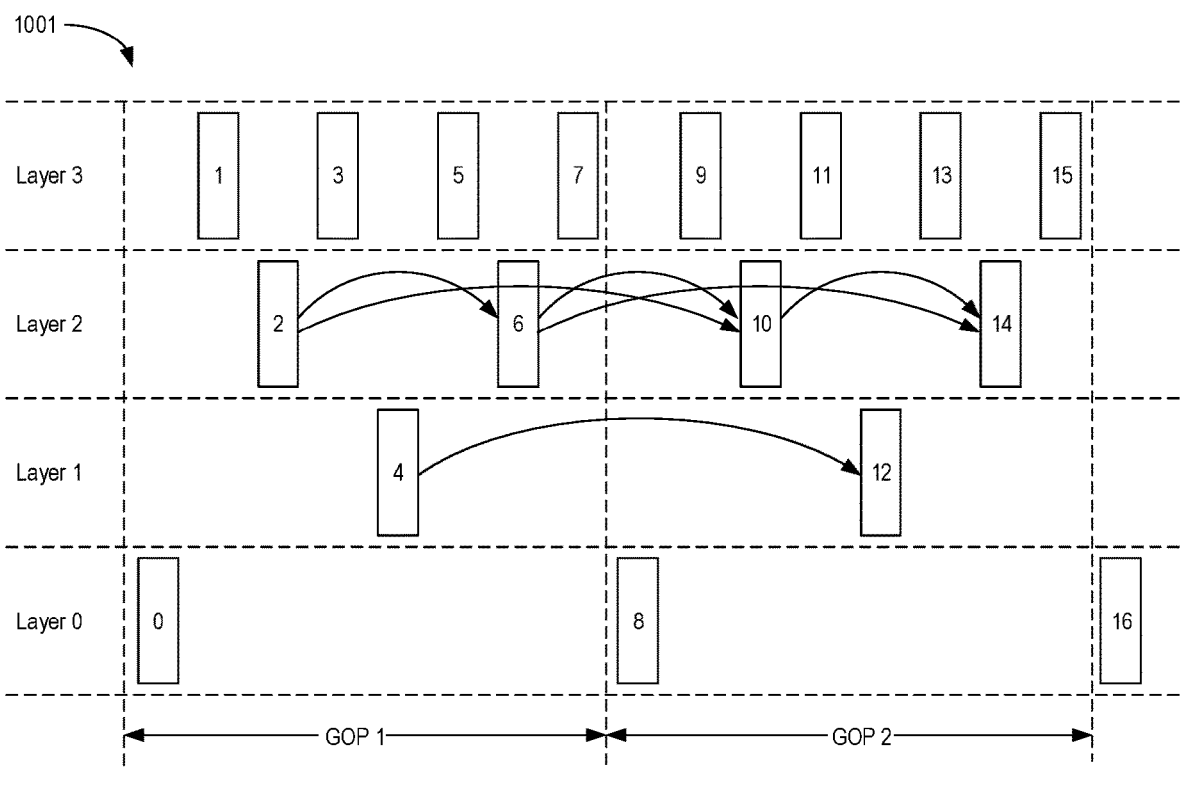
FIG. 10A illustrates a reference structure in accordance with an embodiment of the present disclosure.

(a) In one example, all the coded pictures from the same temporal layer may be added into the RPL. This case is shown in FIG. 10A. FIG. 10A illustrates a reference structure in accordance with an embodiment of the present disclosure, wherein all coded pictures from the same temporal layer are allowed to be used as reference pictures. In FIG. 10A, two GOP, i.e., GOP1 and GOP2, are shown, each GOP comprises 8 pictures. For each GOP, the 8 pictures are assigned to 4 temporal layers, i.e., layer 0, layer 1, layer 2 and layer 3. It is seen that, pictures 0, 8 and 16 belong to layer 0, pictures 4 and 12 belong to layer 1, pictures 2, 6, 10 and 14 belong to layer 2, and pictures 1, 3, 5, 7, 9, 11, 13, and 15 belong to layer 3. As shown in FIG. 10A, picture 12 in layer 1 can refer to picture 4 in layer 1, while picture 12 and picture 4 belong to different GOPs. Likewise, picture 10 in layer 2 can refer to pictures 2 and 6 in layer 2, while picture 10 and pictures 2 and 6 belong to different GOPs.

Figure 10B:
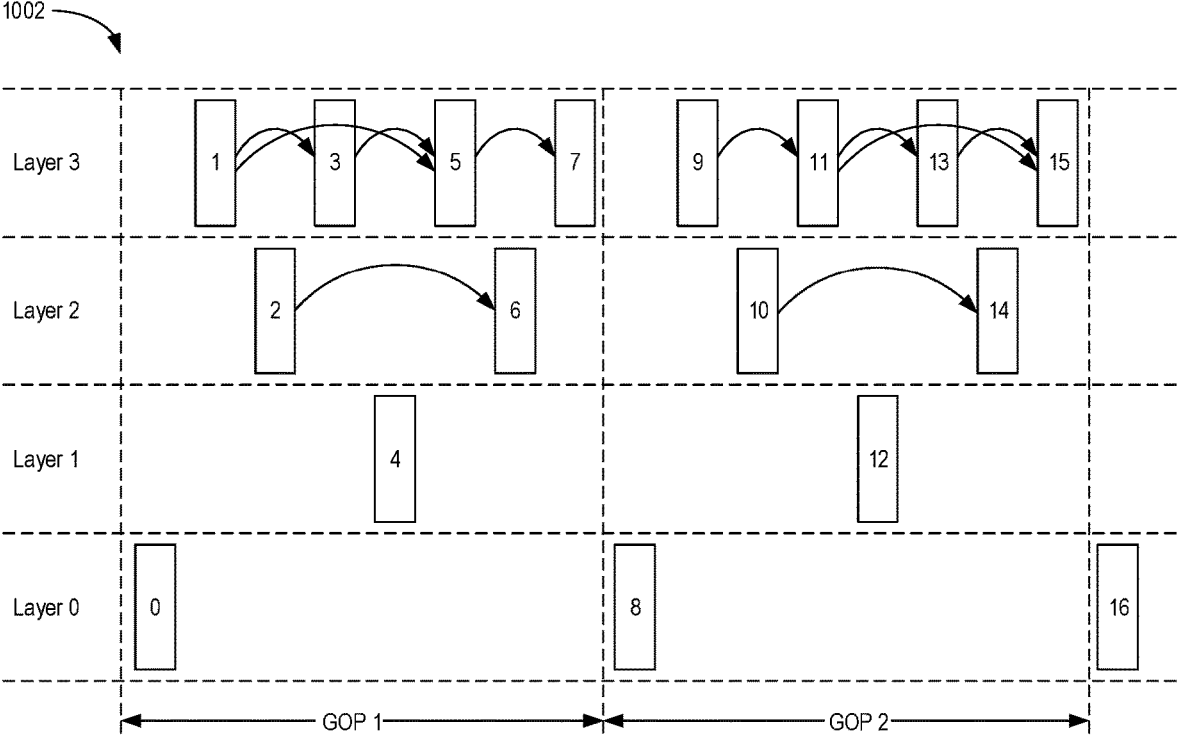
FIG. 10B illustrates a reference structure in accordance with an embodiment of the present disclosure.

(b) In one example, only the coded pictures from the same temporal layer in the same GOP as current picture may be added into the RPL. This case is shown in FIG. 10B. FIG. 10B illustrates a reference structure in accordance with an embodiment of the present disclosure, wherein coded pictures from the same temporal layer in the different GOPs are not allowed to be used as reference pictures. In FIG. 10B, two GOP, i.e., GOP1 and GOP2, are shown, each GOP comprises 8 pictures. Compared with FIG. 10A, picture 10 in layer 2 are not allowed to refer to pictures 2 and 6 in layer 2, since they belong to different GOPs. Pictures are allowed to refer to coded pictures from the same temporal layer in the same GOP. For example, picture 6 in layer 2 refers to picture 2 in layer 2 and picture 5 in layer 3 refer to pictures 1 and 3 in layer 3.

6. It is proposed to add one or more pictures into the RPL as the reference pictures of current picture, wherein the added pictures are the same temporal layer as current picture and one or more reference pictures from lower temporal layers in the RPL may be replaced by the newly added pictures to construct a modified RPL. Denote the newly added reference pictures from the same temporal layer as N and the number of reference pictures replaced by the newly added reference pictures as M, wherein M is less than and equal to N.

a. In one example, the last M reference pictures in the RPL may be replaced by the newly added reference pictures.

(a) In one example, the reference pictures in the RPL may be reordered first and then replaced by the newly added reference pictures.

(b) Alternatively, the first M reference pictures in the RPL may be replaced by the newly added reference pictures.

b. In one example, the reference pictures in the modified RPL may be reordered according to the coded information.

(a) In one example, the reference pictures in the modified RPL may be reordered according to the POC difference between a reference picture and current picture.

c. In one example, it is proposed pictures from more than one temporal layer are allowed to use the pictures from the same temporal layer as references pictures.

(a) In one example, pictures in T temporal layers may be allowed to use reference pictures from the same temporal layer, where T is an integer.

1. In one example, T is equal to 1.

a. In one example, pictures in temporal layer 1, or temporal layer 2 may be allowed to use reference pictures from the same temporal layer.

2. In one example, T is equal to 2.

a. In one example, pictures in both temporal layer 1 and temporal layer 2 may be allowed to use reference pictures from the same temporal layer.

(b) In one example, pictures are allowed to use reference pictures from the same temporal layer when their temporal layers less than or equal to $T_1$.

1. In one example, $T_1$ is equal to 2.

(c) In one example, pictures are allowed to use reference pictures from the same temporal layer when their temporal layers larger than $T_2$.

1. In one example, $T_2$ is equal to 2.

FIG. 11 illustrates a flowchart of a method 1100 for video processing in accordance with some embodiments of the present disclosure. The method 1100 comprises: obtaining 1102 a first reference picture list (RPL) for a target picture of a video; determining 1104 a set of candidate pictures from a plurality of coded pictures of the video, each of the set of candidate pictures having a same temporal layer identity (ID) as the target picture; obtaining 1106 a second RPL based on the set of candidate pictures and the first RPL; and performing 1108 a conversion between the target picture and a bitstream of the video based on the second RPL.

The method 1100 in accordance with some embodiments of the present disclosure enables the utilization of coded pictures in the same temporal layer as the current picture for inter-coding, which makes it possible to enrich the reference pictures used for inter-coding. Compared with the conventional solution where only a picture in lower temporal layer can be used as reference picture, the method 1100 in accordance with some embodiments of the present disclosure can advantageously improve the coding efficiency.

In some embodiments, obtaining 1106 the second RPL may comprise adding the set of candidate pictures into the first RPL to obtain the second RPL. It should be understood that the set of candidate pictures may comprise one or more candidate pictures. Referring to FIG. 10A, the first RPL of picture 12 comprises pictures 8 and 16 in layer 0. The set of candidate pictures comprises picture 4 in layer 1. By adding the picture 4 into the first RPL of picture 12, the second RPL of picture 12 is obtained which comprises pictures 4, 8 and 16. Thereby the available reference pictures are enriched. Hence, the motion compensation and thus the coding efficiency can be improved.

In some embodiments, the number of candidate pictures in the set of candidate pictures may be a constant value, such as 2. It should be understood that the specific value recited here is intended to be exemplary rather than limiting the scope of the present disclosure. In some embodiments, the number of candidate pictures in the set of candidate pictures may be configurable. In some embodiments, the number of candidate pictures in the set of candidate pictures may be indicated by a syntax element, which may be coded into or from the bitstream. The term "syntax element" used herein may refer to a flag, an index or any other suitable element for signaling information. The syntax element may be signaled in various forms. By way of example, the syntax may be signaled at VPS level. The syntax may also be signaled at VPS level. Alternatively, the syntax may also be signaled at SPS level. The syntax may also be signaled at PPS level. The syntax may also be signaled at APS level. The syntax may also be signaled at picture level. In another example, the syntax may also be signaled at sub-picture level. The syntax may also be signaled at slice level. It should be understood that the syntax may also be signaled at any other suitable level, e.g., tile level.

In some embodiments, the method 1100 may further comprise: coding a syntax element into or from the bit-stream, the syntax element indicating that the set of candidate pictures are added into the first RPL. The syntax element may be signaled in various forms. By way of example, the syntax element may be included in video parameter set (VPS). The syntax element may also be included in sequence parameter set (SPS). Alternatively, the syntax element may also be included in picture parameter set (PPS). The syntax element may also be included in adaptation parameter set (APS). Moreover, the syntax element may also be included in picture header. The syntax element may also be included in sub-picture header. The syntax element may also be included in slice header. Furthermore, the syntax element may also be included in tile header. It should be understood that the possible implementation of the syntax element described here are merely illustrative and therefore should not be construed as limiting the present disclosure in any way.

In some embodiments, the set of candidate pictures may be determined based on a coding structure, such a GOP structure. Additionally or alternatively, the set of candidate pictures may be determined based on coded information, such as motion field.

In some embodiments, all the coded pictures from the same temporal layer may be added into the RPL. That is, at least one of the set of candidate pictures belongs to a different group of picture (GOP) from the target picture. Referring to FIG. 10A, picture 12 in layer 1 can refer to picture 4 in layer 1, while picture 12 and picture 4 belong to different GOPs. Likewise, picture 10 in layer 2 can refer to pictures 2 and 6 in layer 2, while picture 10 and pictures 2 and 6 belong to different GOPs. Thereby the available reference pictures are enriched. Hence, the motion compensation and thus the coding efficiency can be improved.

In some embodiments, only the coded pictures from the same temporal layer in the same GOP as current picture may be added into the RPL. That is, each of the set of candidate pictures belongs to a same GOP as the target picture. Referring to FIG. 10B, picture 10 in layer 2 are not allowed to refer to pictures 2 and 6 in layer 2, since they belong to different GOPs. Pictures are allowed to refer to coded pictures from the same temporal layer in the same GOP. For example, picture 6 in layer 2 refers to picture 2 in layer 2 and picture 5 in layer 3 refer to pictures 1 and 3 in layer 3.

In some embodiments, the set of candidate pictures may correspond to a first set of candidate pictures, and obtaining 1106 the second RPL may comprise: replacing a second set of reference pictures in the first RPL with the first set of candidate pictures to obtain the second RPL. In some embodiments, the number of candidate pictures in the first set of candidate pictures is larger than or equal to the number of reference pictures in the second set of reference pictures. Referring to FIG. 10A, the first RPL of picture 12 comprises pictures 8 and 16 in layer 0. The set of candidate pictures comprises picture 4 in layer 1. By replacing picture 16 with picture 4, the second RPL of picture 12 is obtained which comprises pictures 4 and 8. Thereby the available reference pictures are enriched. Hence, the motion compensation and thus the coding efficiency can be improved.

In some embodiments, the method 1100 may further comprise: determining the second set of reference pictures from the first RPL, each of the second set of reference pictures having a lower priority than rest reference pictures in the first RPL. For example, the last M reference pictures in the first RPL may be determined as the second set of reference pictures and replaced by the first set of candidate pictures, wherein M is an integer. Thereby, the motion compensation and thus the coding efficiency can be improved.

In some embodiments, the method 1100 may further comprise: determining the second set of reference pictures from the first RPL, each of the second set of reference pictures having a higher priority than rest reference pictures in the first RPL. For example, the first M reference pictures in the first RPL may be determined as the second set of reference pictures and replaced by the first set of candidate pictures, wherein M is an integer. In addition, the method 1100 may further comprise: reordering the first RPL before determining the second set of reference pictures.

In some embodiments, the method 1100 may further comprise: reordering the second RPL based on coded information. For example, the coded information comprises picture order count (POC) and the second RPL is reordered based on a POC difference between the target picture and each of pictures in the second RPL.

In some embodiments, the method 1100 may further comprise: determining the target from a plurality of pictures to be coded of the video, the target picture has a temporal layer ID in a predetermined set of temporal layer IDs. For example, the predetermined set of temporal layer IDs may be {1, 2}, which corresponds to temporal layer 1 and temporal layer 2, respectively. The predetermined set of temporal layer IDs may also be {1}, {2} or any other suitable set of temporal layer IDs.

In some embodiments, the number of temporal layer IDs in the predetermined set of temporal layer IDs is an integer, such as 2. It should be understood that the specific value recited here is intended to be exemplary rather than limiting the scope of the present disclosure. In some embodiments, each of the predetermined set of temporal layer IDs may be less than or equal to a preset threshold. By way of example, the preset threshold may be 3. In this case the predetermined set of temporal layer IDs may be {1, 2}. It should be understood that the specific value recited here is intended to be exemplary rather than limiting the scope of the present disclosure. In some embodiments, each of the predetermined set of temporal layer IDs may be larger than a preset threshold. By way of example, the preset threshold may be 1. In this case the predetermined set of temporal layer IDs may be {2, 3}. It should be understood that the specific value recited here is intended to be exemplary rather than limiting the scope of the present disclosure.

In some embodiments, the second RPL may comprise a first reference picture and the method 1100 may further comprise: determining an indicator for the first reference picture based on at least one of a temporal layer ID of the target picture or a temporal layer ID of the first reference picture, the indicator indicating whether the first reference picture can be further used as a reference picture for pictures to be coded of the video. The term "indicator" used herein may refer to a flag, an index or any other suitable element. For example, a first reference picture with the same temporal layer ID as the target picture may be removed from the RPL. That is, the indicator of the first reference picture may indicates that the first reference picture cannot be further used as a reference picture for pictures to be coded. Thereby, the management of the RPL can be more accurate and efficient.

FIG. 12 illustrates a flowchart of another method 1200 for video processing in accordance with some embodiments of the present disclosure. The method 1200 comprises: obtaining 1202 a first reference picture list (RPL) for a target picture of a video, the first RPL comprising at least one reference picture with a first resolution; determining 1204 a set of candidate pictures from a plurality of coded pictures of the video based on a similarity between the target picture and each of the plurality of coded pictures, the plurality of coded pictures having a second resolution higher than the first resolution; obtaining 1206 a second RPL based on the set of candidate pictures and the first RPL; and performing 1208 a conversion between the target picture and a bitstream of the video based on the second RPL.

The method 1200 in accordance with some embodiments of the present disclosure employs a coded picture, which has a higher resolution and a higher similarity with the target picture, as a reference picture for the target picture, which makes it possible to enrich the reference pictures can be used for inter-coding and improve the quality of the reference pictures. Compared with the conventional solution where the reference structure is not considered, the method 1200 in accordance with some embodiments of the present disclosure can advantageously improve the coding efficiency.

In some embodiments, the plurality of coded pictures may comprise a first coded picture and determining 1204 the set of candidate pictures may comprise: determining a picture order count (POC) difference between the target picture and the first coded picture; and obtaining the similarity between the target picture and the first coded picture based on the POC difference. Referring to FIG. 8A, the similarity between picture 48 and picture 23 may be characterized by the POC difference 25. For example, a small POC difference between the target picture and the first coded picture may be interpreted as indicating a high similarity between the target picture and the first coded picture. Thus, compared with picture 22, picture 23 has a higher similarity with picture 48.

In some embodiments, the plurality of coded pictures may comprise a first coded picture and determining 1204 the set of candidate pictures may comprise: determining a metric indicating a difference of content or motion between the target picture and the first coded picture; and obtaining the similarity between the target picture and the first coded picture based on the metric. An example of the metric is mean square error (MSE). It should be understood that any other suitable metric can also be employed to determine the similarity. Referring to FIG. 8A, the similarity between picture 48 and picture 23 may be characterized by the MSE between picture 48 and picture 23. For example, a small MSE between the target picture and the first coded picture may be interpreted as indicating a high similarity between the target picture and the first coded picture In some embodiments, each of the set of candidate pictures may have a higher similarity than rest of the coded pictures. That is, pictures having the highest similarity with the target picture will be added into the second RPL. Thereby, the motion compensation and thus the coding efficiency can be improved.

In some embodiments, obtaining the second RPL may comprise: adding the set of candidate pictures into the first RPL to obtain the second RPL. It should be understood that the set of candidate pictures may comprise one or more candidate pictures. Referring to FIGS. 6 and 8A, the first RPL of picture 48 comprises LR pictures 24, 32, 40 and 47. The set of candidate pictures comprises picture 23. By adding the picture 23 into the first RPL of picture 48, the second RPL of picture 48 is obtained which comprises HR pictures 23 and LR pictures 24, 32, 40 and 47.

In some embodiments, the number of candidate pictures in the set of candidate pictures may be a constant value, such as 2. It should be understood that the specific value recited here is intended to be exemplary rather than limiting the scope of the present disclosure. In some embodiments, the number of candidate pictures in the set of candidate pictures may be determined based on coded information. Additionally or alternatively, the number of candidate pictures in the set of candidate pictures may be determined based on video content. In some embodiments, the method 1200 may further comprise: coding a syntax element into or from the bitstream, the syntax element indicating the number of candidate pictures in the set of candidate pictures. The syntax element may be signaled in various forms. By way of example, the syntax may be signaled at VPS level. The syntax may also be signaled at VPS level. Alternatively, the syntax may also be signaled at SPS level. The syntax may also be signaled at PPS level. The syntax may also be signaled at APS level. Moreover, the syntax may also be signaled at picture level. The syntax may also be signaled at sub-picture level. The syntax may also be signaled at slice level. It should be understood that the syntax may also be signaled at any other suitable level, e.g., tile level.

In some embodiments, the set of candidate pictures corresponds to a first set of candidate pictures, and obtaining 1206 the second RPL may comprise: replacing a second set of reference pictures in the first RPL with the first set of candidate pictures to obtain the second RPL. In some embodiments, the number of candidate pictures in the first set of candidate pictures may be larger than or equal to the number of reference pictures in the second set of reference pictures. Referring to FIGS. 6 and 9A, the first RPL of picture 48 comprises LR pictures 24, 32, 40 and 47. The set of candidate pictures comprises picture 23. By replacing the picture 24 in the first RPL with picture 23, the second RPL of picture 48 is obtained which comprises HR pictures 23 and LR pictures 32, 40 and 47.

In some embodiments, the target picture may be any of the plurality of pictures to be coded. In some embodiments, the method 1200 may further comprise: determining the target picture from a plurality of pictures to be coded of the video based on resolutions of the plurality of pictures to be coded. For example, the target picture may be a picture with the second resolution among the plurality of pictures to be coded. By way of example, the picture 49 (shown in FIG. 6) with high resolution can be determined as the target picture. In another example, the target picture may be a picture in the plurality of pictures to be coded, which has the second resolution and only uses pictures with the first resolution as reference pictures. By way of example, the picture 48 (shown in FIG. 6) with high resolution can be determined as the target picture. In FIG. 6 picture 48 only refers to LR pictures. Thereby, the bits cost for RIP can be reduced and the coding efficiency is increased.

For example, the target picture may be a picture with the first resolution among the plurality of pictures to be coded. In another example, the target picture may be a picture in the plurality of pictures to be coded, which has the first resolution and only uses pictures with the second resolution as reference pictures.

In some embodiments, the method 1200 may further comprise: determining the target picture from a plurality of pictures to be coded of the video based on at least one of: coded information, such as QP or motion field, or motion vector; or video content, such as texture complexity.

In some embodiments, the second RPL comprises a first reference picture and the method 1200 may further comprise: determining an indicator for the first reference picture based on at least one of a resolution of the target picture or a resolution of the first reference picture, the indicator indicating whether the first reference picture can be further used as a reference picture for pictures to be coded of the video. By way of example, the resolution of the first reference picture is higher than the resolution of the target picture and the indicator may indicate that the first reference picture can be further used as a reference picture for the pictures to be coded. Referring to FIG. 8B, the newly added HR pictures 22 and 23 may be kept in the RPL for further reference. In some embodiments, the resolution of the first reference picture is lower than the resolution of the target picture and the indicator indicates that the first reference picture cannot be further used as a reference picture for the pictures to be coded. Referring to FIG. 8B, the LR pictures 24, 32, 40 and 47 may be removed from the RPL for further reference. Thereby, the management of the RPL can be more accurate and efficient.

In some embodiments, the method 1200 may further comprise: coding the indicator into or from the bitstream. The indicator may be signaled in various forms. By way of example, the indicator may be included in video parameter set (VPS). The indicator may also be included in sequence parameter set (SPS). The indicator may also be included in picture parameter set (PPS). Alternatively, the indicator may also be included in adaptation parameter set (APS). The indicator may also be included in picture header. Furthermore, the indicator may also be included in sub-picture header. The indicator may also be included in slice header. The indicator may also be included in tile header. It should be understood that the possible implementation of the indicator described here are merely illustrative and therefore should not be construed as limiting the present disclosure in any way.

In some embodiments, the target picture comprises a first coding block and performing the conversion comprises: determining a target reference picture for the first coding block from the second RPL; and signalling an index of the target reference picture based on a resolution of the target picture and a resolution of the target reference picture. For example, when the target reference picture are of the same resolution as the target picture, the index of the target reference picture can be refrained from being signalled. Thereby, the coding efficiency can be further improved.

Implementations of the present disclosure can be described in view of the following clauses, the features of which can be combined in any reasonable manner.

Clause 1. A method for video processing, comprising: obtaining a first reference picture list (RPL) for a target picture of a video; determining a set of candidate pictures from a plurality of coded pictures of the video, each of the set of candidate pictures having a same temporal layer identity (ID) as the target picture; obtaining a second RPL based on the set of candidate pictures and the first RPL; and performing a conversion between the target picture and a bitstream of the video based on the second RPL.

Clause 2. The method of Clause 1, wherein obtaining the second RPL comprises: adding the set of candidate pictures into the first RPL to obtain the second RPL.

Clause 3. The method of Clause 2, further comprising: coding a syntax element into or from the bitstream, the syntax element indicating that the set of candidate pictures are added into the first RPL, the syntax element being included in one of: video parameter set (VPS); sequence parameter set (SPS); picture parameter set (PPS); adaptation parameter set (APS); picture header; sub-picture header; slice header; or tile header.

Clause 4. The method of Clause 3, wherein the number of candidate pictures in the set of candidate pictures is constant or configurable or indicated by the syntax element.

Clause 5. The method of any of Clauses 1-4, wherein the set of candidate pictures is determined based on at least one of: a coding structure; or coded information.

Clause 6. The method of any of Clauses 1-5, wherein at least one of the set of candidate pictures belongs to a different group of picture (GOP) from the target picture.

Clause 7. The method of any of Clauses 1-5, wherein each of the set of candidate pictures belongs to a same GOP as the target picture.

Clause 8. The method of Clause 1, wherein the set of candidate pictures corresponds to a first set of candidate pictures, and obtaining the second RPL comprises: replacing a second set of reference pictures in the first RPL with the first set of candidate pictures to obtain the second RPL.

Clause 9. The method of Clause 8, wherein the number of candidate pictures in the first set of candidate pictures is larger than or equal to the number of reference pictures in the second set of reference pictures.

Clause 10. The method of any of Clauses 8-9, further comprising: determining the second set of reference pictures from the first RPL, each of the second set of reference pictures having a lower priority than rest reference pictures in the first RPL.

Clause 11. The method of any of Clauses 8-9, further comprising: determining the second set of reference pictures from the first RPL, each of the second set of reference pictures having a higher priority than rest reference pictures in the first RPL.

Clause 12. The method of any of Clauses 10-11, further comprising: reordering the first RPL before determining the second set of reference pictures.

Clause 13. The method of any of Clauses 1-12, further comprising: reordering the second RPL based on coded information.

Clause 14. The method of Clause 13, wherein the coded information comprises picture order count (POC) and the second RPL is reordered based on a POC difference between the target picture and each of pictures in the second RPL.

Clause 15. The method of any of Clauses 1-14, further comprising: determining the target from a plurality of pictures to be coded of the video, the target picture has a temporal layer ID in a predetermined set of temporal layer IDs.

Clause 16. The method of Clause 15, wherein the number of temporal layer IDs in the predetermined set of temporal layer IDs is an integer.

Clause 17. The method of any of Clauses 15-16, wherein the predetermined set of temporal layer IDs comprises at least one of 1 or 2.

Clause 18. The method of any of Clauses 15-16, wherein each of the predetermined set of temporal layer IDs is less than or equal to a preset threshold.

Clause 19. The method of any of Clauses 15-16, wherein each of the predetermined set of temporal layer IDs is larger than a preset threshold.

Clause 20. The method of any of Clauses 1-19, wherein the second RPL comprises a first reference picture and the method further comprises: determining an indicator for the first reference picture based on at least one of a temporal layer ID of the target picture or a temporal layer ID of the first reference picture, the indicator indicating whether the first reference picture can be further used as a reference picture for pictures to be coded of the video.

Clause 21. A method for video processing, comprising: obtaining a first reference picture list (RPL) for a target picture of a video, the first RPL comprising at least one reference picture with a first resolution; determining a set of candidate pictures from a plurality of coded pictures of the video based on a similarity between the target picture and each of the plurality of coded pictures, the plurality of coded pictures having a second resolution higher than the first resolution; obtaining a second RPL based on the set of candidate pictures and the first RPL; and performing a conversion between the target picture and a bitstream of the video based on the second RPL.

Clause 22. The method of Clause 21, wherein the plurality of coded pictures comprise a first coded picture and determining the set of candidate pictures comprises: determining a picture order count (POC) difference between the target picture and the first coded picture; and obtaining the similarity between the target picture and the first coded picture based on the POC difference.

Clause 23. The method of Clause 21, wherein the plurality of coded pictures comprise a first coded picture and determining the set of candidate pictures comprises: determining a metric indicating a difference of content or motion between the target picture and the first coded picture; and obtaining the similarity between the target picture and the first coded picture based on the metric.

Clause 24. The method of Clause 23, wherein the metric comprises mean square error (MSE).

Clause 25. The method of any of Clauses 21-24, wherein each of the set of candidate pictures has a higher similarity than rest of the coded pictures.

Clause 26. The method of any of Clauses 21-25, wherein obtaining the second RPL comprises: adding the set of candidate pictures into the first RPL to obtain the second RPL.

Clause 27. The method of any of Clauses 21-26, wherein the number of candidate pictures in the set of candidate pictures is constant or determined based on at least one of: coded information; or video content.

Clause 28. The method of any of Clauses 21-26, further comprising: coding a syntax element into or from the bitstream, the syntax element indicating the number of candidate pictures in the set of candidate pictures, the syntax element being included in one of: video parameter set (VPS); sequence parameter set (SPS); picture parameter set (PPS); adaptation parameter set (APS); picture header; sub-picture header; slice header; or tile header.

Clause 29. The method of Clause 21-25, wherein the set of candidate pictures corresponds to a first set of candidate pictures, and obtaining the second RPL comprises: replacing a second set of reference pictures in the first RPL with the first set of candidate pictures to obtain the second RPL.

Clause 30. The method of Clause 29, wherein the number of candidate pictures in the first set of candidate pictures is larger than or equal to the number of reference pictures in the second set of reference pictures.

Clause 31. The method of any of Clauses 21-30, further comprising: determining the target picture from a plurality of pictures to be coded of the video based on resolutions of the plurality of pictures to be coded.

Clause 32. The method of any of Clauses 21-30, further comprising: determining the target picture from a plurality of pictures to be coded of the video based on at least one of: coded information; or video content.

Clause 33. The method of Clauses 21-32, wherein the second RPL comprises a first reference picture and the method further comprises: determining an indicator for the first reference picture based on at least one of a resolution of the target picture or a resolution of the first reference picture, the indicator indicating whether the first reference picture can be further used as a reference picture for pictures to be coded of the video.

Clause 34. The method of Clause 33, wherein the resolution of the first reference picture is higher than the resolution of the target picture and the indicator indicates that the first reference picture can be further used as a reference picture for the pictures to be coded.

Clause 35. The method of Clause 33, wherein the resolution of the first reference picture is lower than the resolution of the target picture and the indicator indicates that the first reference picture cannot be further used as a reference picture for the pictures to be coded.

Clause 36. The method of any of Clauses 33-35, further comprising: coding the indicator into or from the bitstream, the indicator being included in one of: sequence parameter set (SPS); picture parameter set (PPS); picture header; or slice header.

Clause 37. The method of any of Clauses 21-36, the target picture comprises a first coding block and performing the conversion comprises: determining a target reference picture for the first coding block from the second RPL; and signaling an index of the target reference picture based on a resolution of the target picture and a resolution of the target reference picture.

Clause 38. An electronic device, comprising: a processing unit; and a memory coupled to the processing unit and having instructions stored thereon which, when executed by the processing unit, cause the electronic device to perform a method in accordance with any of Clauses 1-37.

Clause 39. A non-transitory computer-readable storage medium storing instructions that cause a processor to perform a method in accordance with any of Clauses 1-37.

Clause 40. A non-transitory computer-readable recording medium storing a bitstream of a video which is generated by a method in accordance with any of Clauses 1-37, wherein the method is performed by a video processing apparatus.

Example Device

Figure 13:
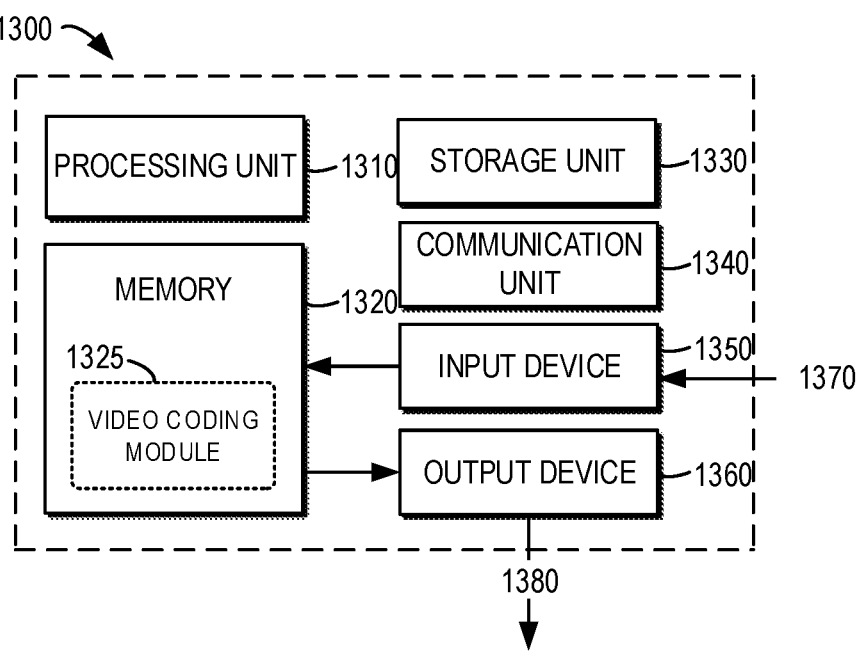
FIG. 13 illustrates a block diagram of a computing device in which various embodiments of the present disclosure can be implemented.

FIG. 13 illustrates a block diagram of a computing device 1300 in which various embodiments of the present disclosure can be implemented. The computing device 1300 may be implemented as or included in the source device 110 (or the video encoder 114 or 200) or the destination device 120 (or the video decoder 124 or 300).

It would be appreciated that the computing device 1300 shown in FIG. 13 is merely for purpose of illustration, without suggesting any limitation to the functions and scopes of the embodiments of the present disclosure in any manner.

As shown in FIG. 13, the computing device 1300 includes a general-purpose computing device 1300. The computing device 1300 may at least comprise one or more processors or processing units 1310, a memory 1320, a storage unit 1330, one or more communication units 1340, one or more input devices 1350, and one or more output devices 1360.

In some embodiments, the computing device 1300 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/ video player, digital camera/video camera, positioning device, television receiver, radio broadcast receiver, E-book device, gaming device, or any combination thereof, including the accessories and peripherals of these devices, or any combination thereof. It would be contemplated that the computing device 1300 can support any type of interface to a user (such as "wearable" circuitry and the like).

The processing unit 1310 may be a physical or virtual processor and can implement various processes based on programs stored in the memory 1320. In a multi-processor system, multiple processing units execute computer executable instructions in parallel so as to improve the parallel processing capability of the computing device 1300. The processing unit 1310 may also be referred to as a central processing unit (CPU), a microprocessor, a controller or a microcontroller.

The computing device 1300 typically includes various computer storage medium. Such medium can be any medium accessible by the computing device 1300, including, but not limited to, volatile and non-volatile medium, or detachable and non-detachable medium. The memory 1320 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1330 may be any detachable or non-detachable medium and may include a machine-readable medium such as a memory, flash memory drive, magnetic disk or another other media, which can be used for storing information and/or data and can be accessed in the computing device 1300.

The computing device 1300 may further include additional detachable/non-detachable, volatile/non-volatile memory medium. Although not shown in FIG. 13, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1340 communicates with a further computing device via the communication medium. In addition, the functions of the components in the computing device 1300 can be implemented by a single computing cluster or multiple computing machines that can communicate via communication connections. Therefore, the computing device 1300 can operate in a networked environment using a logical connection with one or more other servers, networked personal computers (PCs) or further general network nodes.

The input device 1350 may be one or more of a variety of input devices, such as a mouse, keyboard, tracking ball, voice-input device, and the like. The output device 1360 may be one or more of a variety of output devices, such as a display, loudspeaker, printer, and the like. By means of the communication unit 1340, the computing device 1300 can further communicate with one or more external devices (not shown) such as the storage devices and display device, with one or more devices enabling the user to interact with the computing device 1300, or any devices (such as a network card, a modem and the like) enabling the computing device 1300 to communicate with one or more other computing devices, if required. Such communication can be performed via input/output (I/O) interfaces (not shown).

In some embodiments, instead of being integrated in a single device, some or all components of the computing device 1300 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1300 may be used to implement video encoding/decoding in embodiments of the present disclosure. The memory 1320 may include one or more video coding modules 1325 having one or more program instructions. These modules are accessible and executable by the processing unit 1310 to perform the functionalities of the various embodiments described herein.

In the example embodiments of performing video encoding, the input device 1350 may receive video data as an input 1370 to be encoded. The video data may be processed, for example, by the video coding module 1325, to generate an encoded bitstream. The encoded bitstream may be provided via the output device 1360 as an output 1380.

In the example embodiments of performing video decoding, the input device 1350 may receive an encoded bitstream as the input 1370. The encoded bitstream may be processed, for example, by the video coding module 1325, to generate decoded video data. The decoded video data may be provided via the output device 1360 as the output 1380.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

obtaining a first reference picture list (RPL) for a target picture of a video;

determining a set of candidate pictures from a plurality of coded pictures of the video;

obtaining a second RPL based on the set of candidate pictures and the first RPL; and performing a conversion between the target picture and a bitstream of the video based on the second RPL, wherein each of the set of candidate pictures has a same temporal layer identity (ID) as the target picture, or wherein the first RPL comprises at least one reference picture with a first resolution, the set of candidate pictures are determined based on a similarity between the target picture and each of the plurality of coded pictures, and the plurality of coded pictures have a second resolution higher than the first resolution.

2. The method of claim 1, wherein obtaining the second RPL comprises:

adding the set of candidate pictures into the first RPL to obtain the second RPL.

3. The method of claim 2, further comprising:

coding a syntax element into or from the bitstream, the syntax element indicating that the set of candidate pictures are added into the first RPL, the syntax element being included in one of:

video parameter set (VPS);

sequence parameter set (SPS);

picture parameter set (PPS);

adaptation parameter set (APS);

picture header;

sub-picture header;

slice header; or tile header.

4. The method of claim 1, wherein a number of candidate pictures in the set of candidate pictures is constant or configurable or indicated by a syntax element or determined based on at least one of coded information or video content, or wherein the set of candidate pictures is determined based on at least one of a coding structure or coded information, or wherein at least one of the set of candidate pictures belongs to a different group of picture (GOP) from the target picture, or wherein each of the set of candidate pictures belongs to a same GOP as the target picture.

5. The method of claim 1, wherein the set of candidate pictures corresponds to a first set of candidate pictures, and obtaining the second RPL comprises:

replacing a second set of reference pictures in the first RPL with the first set of candidate pictures to obtain the second RPL.

6. The method of claim 5, wherein a number of candidate pictures in the first set of candidate pictures is larger than or equal to a number of reference pictures in the second set of reference pictures, or wherein the method further comprises:

determining the second set of reference pictures from the first RPL, each of the second set of reference pictures having a lower priority than rest reference pictures in the first RPL other than the second set of reference pictures, or determining the second set of reference pictures from the first RPL, each of the second set of reference pictures having a higher priority than rest reference pictures in the first RPL other than the second set of reference pictures.

7. The method of claim 6, further comprising:

reordering the first RPL before determining the second set of reference pictures.

8. The method of claim 1, wherein the method further comprises reordering the second RPL based on coded information, or wherein the method further comprises determining the target picture from a plurality of pictures to be coded of the video based on at least one of resolutions of the plurality of pictures to be coded, coded information, or video content, or wherein the method further comprises coding a syntax element into or from the bitstream, the syntax element indicating a number of candidate pictures in the set of candidate pictures, the syntax element being included in one of: video parameter set (VPS), sequence parameter set (SPS), picture parameter set (PPS), adaptation parameter set (APS), picture header, sub-picture header, slice header, or tile header, or wherein each of the set of candidate pictures has the same temporal layer ID as the target picture, the second RPL comprises a first reference picture and the method further comprises: determining an indicator for the first reference picture based on at least one of a temporal layer ID of the target picture or a temporal layer ID of the first reference picture, the indicator indicating whether the first reference picture can be further used as a reference picture for pictures to be coded of the video.

9. The method of claim 8, wherein the coded information comprises picture order count (POC) and the second RPL is reordered based on a POC difference between the target picture and each of pictures in the second RPL.

10. The method of claim 1, wherein each of the set of candidate pictures has the same temporal layer ID as the target picture and the method further comprises:

determining the target picture from a plurality of pictures to be coded of the video, the target picture has a temporal layer ID in a predetermined set of temporal layer IDs.

11. The method of claim 10, wherein a number of temporal layer IDs in the predetermined set of temporal layer IDs is an integer, or wherein the predetermined set of temporal layer IDs comprises at least one of 1 or 2, or wherein each of the predetermined set of temporal layer IDs is less than or equal to a preset threshold, or wherein each of the predetermined set of temporal layer IDs is larger than a preset threshold.

12. The method of claim 1, wherein the first RPL comprises at least one reference picture with the first resolution, the set of candidate pictures are determined based on the similarity between the target picture and each of the plurality of coded pictures, the plurality of coded pictures have the second resolution higher than the first resolution, the plurality of coded pictures comprise a first coded picture and determining the set of candidate pictures comprises:

determining a picture order count (POC) difference between the target picture and the first coded picture; and obtaining the similarity between the target picture and the first coded picture based on the POC difference, or wherein determining the set of candidate pictures comprises:

determining a metric indicating a difference of content or motion between the target picture and the first coded picture; and obtaining the similarity between the target picture and the first coded picture based on the metric.

13. The method of claim 12, wherein the metric comprises mean square error (MSE).

14. The method of claim 1, wherein the first RPL comprises at least one reference picture with the first resolution, the set of candidate pictures are determined based on the similarity between the target picture and each of the plurality of coded pictures, the plurality of coded pictures have the second resolution higher than the first resolution, and each of the set of candidate pictures has a higher similarity than rest of the coded pictures.

15. The method of claim 1, wherein the second RPL comprises a first reference picture and the method further comprises:

determining an indicator for the first reference picture based on at least one of a resolution of the target picture or a resolution of the first reference picture, the indicator indicating whether the first reference picture can be further used as a reference picture for pictures to be coded of the video.

16. The method of claim 15, wherein the resolution of the first reference picture is higher than the resolution of the target picture and the indicator indicates that the first reference picture can be further used as a reference picture for the pictures to be coded, or wherein the resolution of the first reference picture is lower than the resolution of the target picture and the indicator indicates that the first reference picture cannot be further used as a reference picture for the pictures to be coded.

17. The method of claim 15, further comprising:

coding the indicator into or from the bitstream, the indicator being included in one of:

sequence parameter set (SPS);

picture parameter set (PPS);

picture header; or slice header.

18. The method of claim 1, wherein the target picture comprises a first coding block and performing the conversion comprises:

determining a target reference picture for the first coding block from the second RPL; and signaling an index of the target reference picture based on a resolution of the target picture and a resolution of the target reference picture.

19. An electronic device, comprising:

a processing unit; and a memory coupled to the processing unit and having instructions stored thereon which, when executed by the processing unit, cause the electronic device to perform a method comprising:

obtaining a first reference picture list (RPL) for a target picture of a video;

determining a set of candidate pictures from a plurality of coded pictures of the video;

obtaining a second RPL based on the set of candidate pictures and the first RPL; and performing a conversion between the target picture and a bitstream of the video based on the second RPL, wherein each of the set of candidate pictures has a same temporal layer identity (ID) as the target picture, or wherein the first RPL comprises at least one reference picture with a first resolution, the set of candidate pictures are determined based on a similarity between the target picture and each of the plurality of coded pictures, and the plurality of coded pictures have a second resolution higher than the first resolution.

20. A non-transitory computer-readable storage medium storing instructions that cause a processor to perform a method comprising:

obtaining a first reference picture list (RPL) for a target picture of a video;

determining a set of candidate pictures from a plurality of coded pictures of the video;

obtaining a second RPL based on the set of candidate pictures and the first RPL; and performing a conversion between the target picture and a bitstream of the video based on the second RPL, wherein each of the set of candidate pictures has a same temporal layer identity (ID) as the target picture, or wherein the first RPL comprises at least one reference picture with a first resolution, the set of candidate pictures are determined based on a similarity between the target picture and each of the plurality of coded pictures, and the plurality of coded pictures have a second resolution higher than the first resolution.

21. The method of claim 1, further comprising:

storing the bitstream in a non-transitory computer-readable recording medium.

22. The method of claim 1, wherein the conversion includes encoding the target picture into the bitstream.

23. The method of claim 1, wherein the conversion includes decoding the target picture from the bitstream.

* * * * *